United States Patent
Boundy et al.

(10) Patent No.: US 12,169,013 B2
(45) Date of Patent: ***Dec. 17, 2024

(54) SHEAR THICKENING FLUID BASED OBJECT MOVEMENT CONTROL METHOD AND MECHANISM

(71) Applicant: Moshun, LLC, Oak Brook, IL (US)

(72) Inventors: Timothy John Boundy, Deer Park, IL (US); Steven Michael Barger, Bartlett, IL (US); Terence Michael Lydon, Westmont, IL (US); Richard Michael Lang, Howey In The Hills, FL (US); Wilfredo Gonzalez, Jr., Plainfield, IL (US); Darren Michael Boundy, Long Grove, IL (US); Eric McHugh, Naperville, IL (US); David Schuda, Wheaton, IL (US); George L Wilson, IV, Kalamazoo, MI (US); Gary W. Grube, Barrington Hills, IL (US); Jason K. Resch, Warwick, RI (US); Mario F. DeRango, Cary, IL (US); John Edward Buchalo, South Barrington, IL (US); Richard A. Herbst, Clarendon Hills, IL (US); Kurt Estes, Lake Zurich, IL (US); Evan Anderson, Naples, FL (US)

(73) Assignee: Moshun, LLC, Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,463

(22) Filed: Sep. 30, 2023

(65) Prior Publication Data
US 2024/0035542 A1    Feb. 1, 2024

Related U.S. Application Data

(63) Continuation of application No. 17/539,092, filed on Nov. 30, 2021, now Pat. No. 11,802,605.
(Continued)

(51) Int. Cl.
*F16F 9/53*    (2006.01)
*F16F 9/19*    (2006.01)
(Continued)

(52) U.S. Cl.
CPC ............... *F16F 9/53* (2013.01); *F16F 9/19* (2013.01); *F16F 9/30* (2013.01); *F16F 9/3292* (2013.01);
(Continued)

(58) Field of Classification Search
CPC .............. F15B 15/1447; F15B 15/2838; F15B 15/286; F16F 9/3214; F16F 9/3264;
(Continued)

(56) References Cited

U.S. PATENT DOCUMENTS 1,704,217 A    3/1929    Rosenthal
1,736,175 A    11/1929   Rosenthal
(Continued)

FOREIGN PATENT DOCUMENTS

CN    210087086 U    2/2020
DE    202006006422 U1    8/2006
(Continued)

OTHER PUBLICATIONS

International Searching Authority; International Search Report and Written Opinion; International Application No. PCT/US23/16082/; Aug. 24, 2023; 20 pgs.

*Primary Examiner* — Vishal R Sahni
(74) *Attorney, Agent, or Firm* — Gary W. Grube

(57) ABSTRACT

A head unit system for controlling motion of an object includes a secondary object sensor, shear thickening fluid (Continued)

(STF), and a chamber configured to contain a portion of the STF. The chamber further includes a front channel and a back channel. The head unit system further includes a piston housed at least partially radially within the piston compartment and separating the back channel and the front channel. The piston includes a first piston bypass and a second piston bypasses to control flow of the STF between opposite sides of the piston. The chamber further includes a set of fluid manipulation emitters to control the flow of the STF to cause selection of one of a variety of shear rates for the STF within the chamber.

14 Claims, 15 Drawing Sheets

Related U.S. Application Data

(60) Provisional application No. 63/273,230, filed on Oct. 29, 2021.

(51) Int. Cl.
  *F16F 9/30* (2006.01)
  *F16F 9/32* (2006.01)
  *F16F 9/516* (2006.01)

(52) U.S. Cl.
  CPC .......... *F16F 9/516* (2013.01); *F16F 2222/12* (2013.01); *F16F 2224/04* (2013.01); *F16F 2224/041* (2013.01); *F16F 2228/066* (2013.01); *F16F 2230/08* (2013.01); *F16F 2230/18* (2013.01); *F16F 2232/08* (2013.01); *F16F 2236/103* (2013.01)

(58) Field of Classification Search
  CPC ................ F16F 9/303; F16F 2224/045; F16F 2238/045; G06F 16/284; G01R 33/07
  See application file for complete search history.

(56) References Cited

U.S. PATENT DOCUMENTS

| | | | |
|---|---|---|---|
| 1,965,806 A | 7/1934 | Riggins | |
| 2,015,989 A | 10/1935 | Bommer | |
| 2,740,308 A | 4/1956 | Blanchard | |
| 3,284,841 A | 11/1966 | Patriquin | |
| 3,400,796 A | 9/1968 | Savins | |
| 3,487,494 A | 1/1970 | De Baan | |
| 3,489,087 A | 1/1970 | Soderberg | |
| 3,548,977 A | 12/1970 | Morgan | |
| 3,979,790 A | 9/1976 | Chiarappa | |
| 4,452,437 A | 6/1984 | Lochner | |
| 4,590,639 A | 5/1986 | Fritsche | |
| 4,658,468 A | 4/1987 | Tillmann | |
| 5,078,552 A | 1/1992 | Albel | |
| 5,172,929 A | 12/1992 | Butsuen | |
| 5,341,905 A * | 8/1994 | Lu | F16F 9/467 188/320 |
| 5,924,714 A | 7/1999 | Farris | |
| 7,628,257 B1 | 12/2009 | Lu | |
| 7,825,045 B1 | 11/2010 | Wagner | |
| 7,918,167 B2 | 4/2011 | Tanielian et al. | |
| 8,276,497 B2 | 10/2012 | Hunn | |
| 8,499,908 B2 | 8/2013 | Barker et al. | |
| 8,943,652 B2 | 2/2015 | Bacchetti | |
| 9,303,709 B2 * | 4/2016 | Manes | F16F 9/10 |
| 9,453,550 B2 | 9/2016 | Smith et al. | |
| 9,498,690 B2 | 11/2016 | Carlson et al. | |
| 9,970,831 B2 | 5/2018 | Shih | |
| 10,017,082 B2 | 7/2018 | Zwaan | |
| 10,161,173 B2 | 12/2018 | Kruedener et al. | |
| 10,371,097 B2 | 8/2019 | Sellinger et al. | |
| 10,443,678 B2 | 10/2019 | Galindo Rosales et al. | |
| 10,462,578 B2 | 10/2019 | Hoskins et al. | |
| 10,480,281 B2 | 11/2019 | Al-Olayan et al. | |
| 10,580,231 B2 | 3/2020 | Lin | |
| 10,633,905 B2 | 4/2020 | Feng | |
| 10,920,474 B2 | 2/2021 | Shinmura | |
| 11,566,641 B1 * | 1/2023 | Boundy | F15B 15/2861 |
| 11,592,039 B1 | 2/2023 | Boundy | |
| 11,802,605 B2 * | 10/2023 | Boundy | F16F 9/516 |
| 2002/0010977 A1 | 1/2002 | Salice | |
| 2003/0155196 A1 | 8/2003 | Nishiyama | |
| 2003/0213663 A1 | 11/2003 | Salice | |
| 2004/0068833 A1 | 4/2004 | Sawa | |
| 2004/0173422 A1 * | 9/2004 | Deshmukh | F16F 9/006 188/267.2 |
| 2005/0034269 A1 | 2/2005 | Jinbo | |
| 2006/0278483 A1 | 12/2006 | Jiang | |
| 2009/0119873 A1 | 5/2009 | Bassi | |
| 2009/0241287 A1 | 10/2009 | Reid | |
| 2010/0162521 A1 | 7/2010 | Pyo | |
| 2010/0170062 A1 | 7/2010 | Kim | |
| 2010/0287729 A1 | 11/2010 | Jin | |
| 2010/0319260 A1 | 12/2010 | Sawa | |
| 2011/0127706 A1 | 6/2011 | Sims | |
| 2012/0233810 A1 | 9/2012 | Salutzki | |
| 2013/0097805 A1 | 4/2013 | Bland | |
| 2014/0033476 A1 | 2/2014 | Bacchetti | |
| 2014/0352111 A1 | 12/2014 | Ng | |
| 2015/0040998 A1 | 2/2015 | Gilstad | |
| 2016/0215552 A1 | 7/2016 | Lohken et al. | |
| 2016/0238100 A1 * | 8/2016 | Smith | B64C 25/60 |
| 2017/0096850 A1 | 4/2017 | Hopkins | |
| 2017/0210458 A1 | 7/2017 | Tothill et al. | |
| 2017/0226682 A1 | 8/2017 | Duckworth | |
| 2017/0304057 A1 | 10/2017 | Bichler | |
| 2018/0010614 A1 | 1/2018 | Sellinger | |
| 2018/0266512 A1 | 9/2018 | Zimmer | |
| 2018/0328445 A1 | 11/2018 | Gilbert | |
| 2019/0040667 A1 | 2/2019 | Feng | |
| 2019/0128362 A1 | 5/2019 | Naserimojarad | |
| 2019/0371090 A1 | 12/2019 | Lin et al. | |
| 2020/0011110 A1 * | 1/2020 | Boundy | B23B 49/026 |
| 2020/0238780 A1 * | 7/2020 | Dhaens | F16F 9/0218 |
| 2020/0240190 A1 | 7/2020 | Held | |
| 2020/0408019 A1 | 12/2020 | Vos | |
| 2022/0220788 A1 | 7/2022 | Boundy | |
| 2022/0221019 A1 | 7/2022 | Boundy | |
| 2022/0221020 A1 | 7/2022 | Boundy | |
| 2023/0103233 A1 * | 3/2023 | Boundy | F16F 9/3214 188/268 |
| 2023/0133625 A1 * | 5/2023 | Boundy | F16F 9/53 |
| 2023/0139420 A1 * | 5/2023 | Boundy | F16F 9/3292 |
| 2023/0167874 A1 * | 6/2023 | Boundy | F16F 9/53 188/322.5 |

FOREIGN PATENT DOCUMENTS

| | | |
|---|---|---|
| DE | 202006011846 U1 | 12/2007 |
| DE | 102008014329 A1 | 9/2009 |
| EP | 0063635 B1 | 2/1985 |
| GB | 2589152 A | 5/2021 |
| JP | 2003266222 A | 9/2003 |
| JP | 2004353712 A | 12/2004 |
| JP | 2009531631 A | 9/2009 |
| JP | 2014118303 A | 6/2014 |
| KR | 200165472 Y1 | 2/2000 |
| KR | 100337469 B1 | 5/2002 |
| KR | 2020040018600 | 6/2006 |
| KR | 20070014713 A | 2/2007 |
| KR | 102117780 B1 | 6/2020 |
| WO | 2007116273 A1 | 10/2007 |
| WO | 2015132254 A1 | 9/2015 |
| WO | 2020103458 A1 | 5/2020 |

* cited by examiner

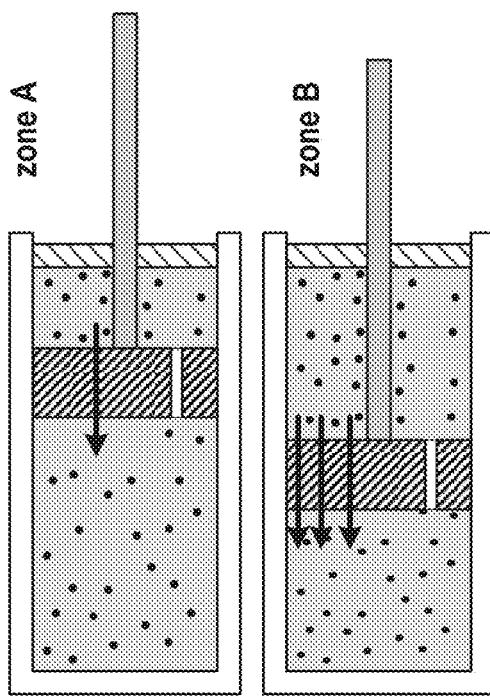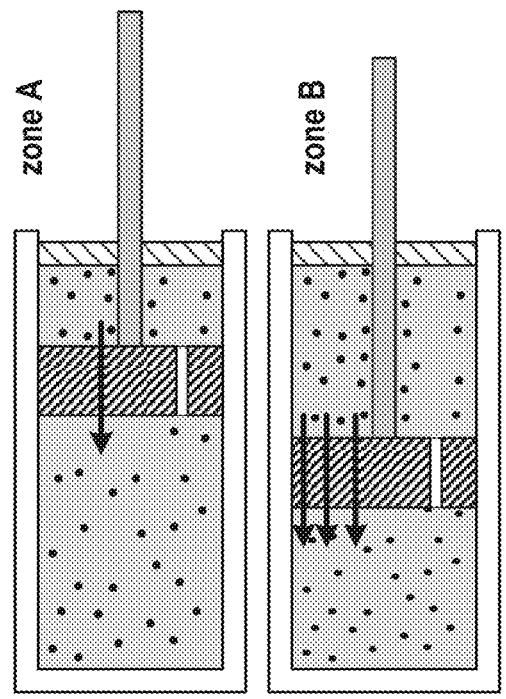
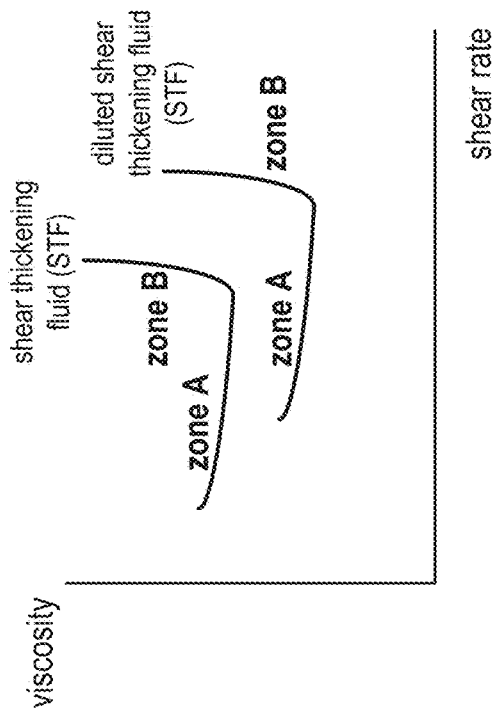
FIG. 1B
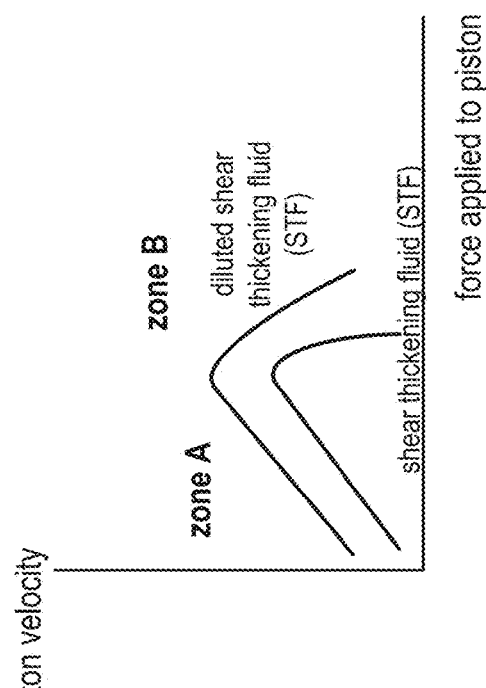
FIG. 1C

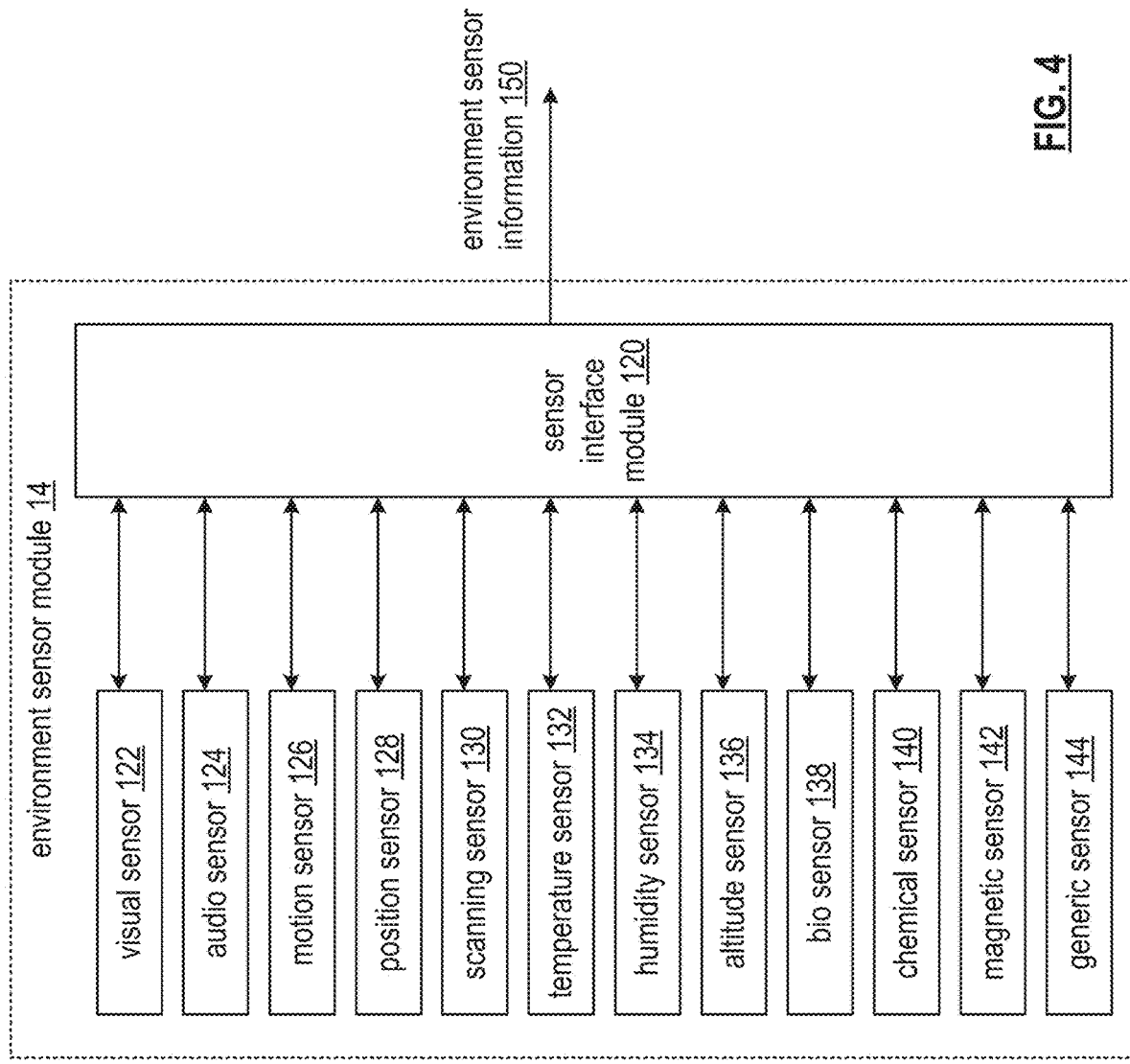

SHEAR THICKENING FLUID BASED OBJECT MOVEMENT CONTROL METHOD AND MECHANISM

CROSS-REFERENCE TO RELATED APPLICATIONS

The present U.S. Utility patent application claims priority pursuant to 35 U.S.C. § 120 as a continuation of U.S. Utility application Ser. No. 17/539,092, entitled "SHEAR THICKENING FLUID BASED OBJECT MOVEMENT CONTROL METHOD AND MECHANISM" filed Nov. 30, 2021, allowed, which claims priority pursuant to 35 U.S.C. § 119(e) to U.S. Provisional Application No. 63/273,230, entitled "SHEAR THICKENING FLUID BASED OBJECT MOVEMENT CONTROL MECHANISM", filed Oct. 29, 2021, all of which are hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to systems that measure and control mechanical movement and more particularly to sensing and controlling of a linear and/or rotary movement mechanism that includes a chamber with dilatant fluid (e.g., a shear thickening fluid).

Description of Related Art

Many mechanical mechanisms are subject to undesired movement that can lead to annoying sounds, property damage and/or loss, and personal injury and even death. Desired and undesired movements of the mechanical mechanisms may involve a wide range of forces. A need exists to control the wide range of forces to solve these problems.

BRIEF DESCRIPTION OF THE SEVERAL VIEWS OF THE DRAWING(S)

FIG. 1B is a graph of viscosity vs. shear rate for an aspect of an embodiment of a mechanical and computing system in accordance with the present invention;

FIG. 1C is a graph of plunger velocity vs. force applied to the plunger for an aspect of an embodiment of a mechanical and computing system in accordance with the present invention;

FIG. 4 is a schematic block diagram of an embodiment of an environment sensor module of a computing system in accordance with the present invention;

Figure 8A:
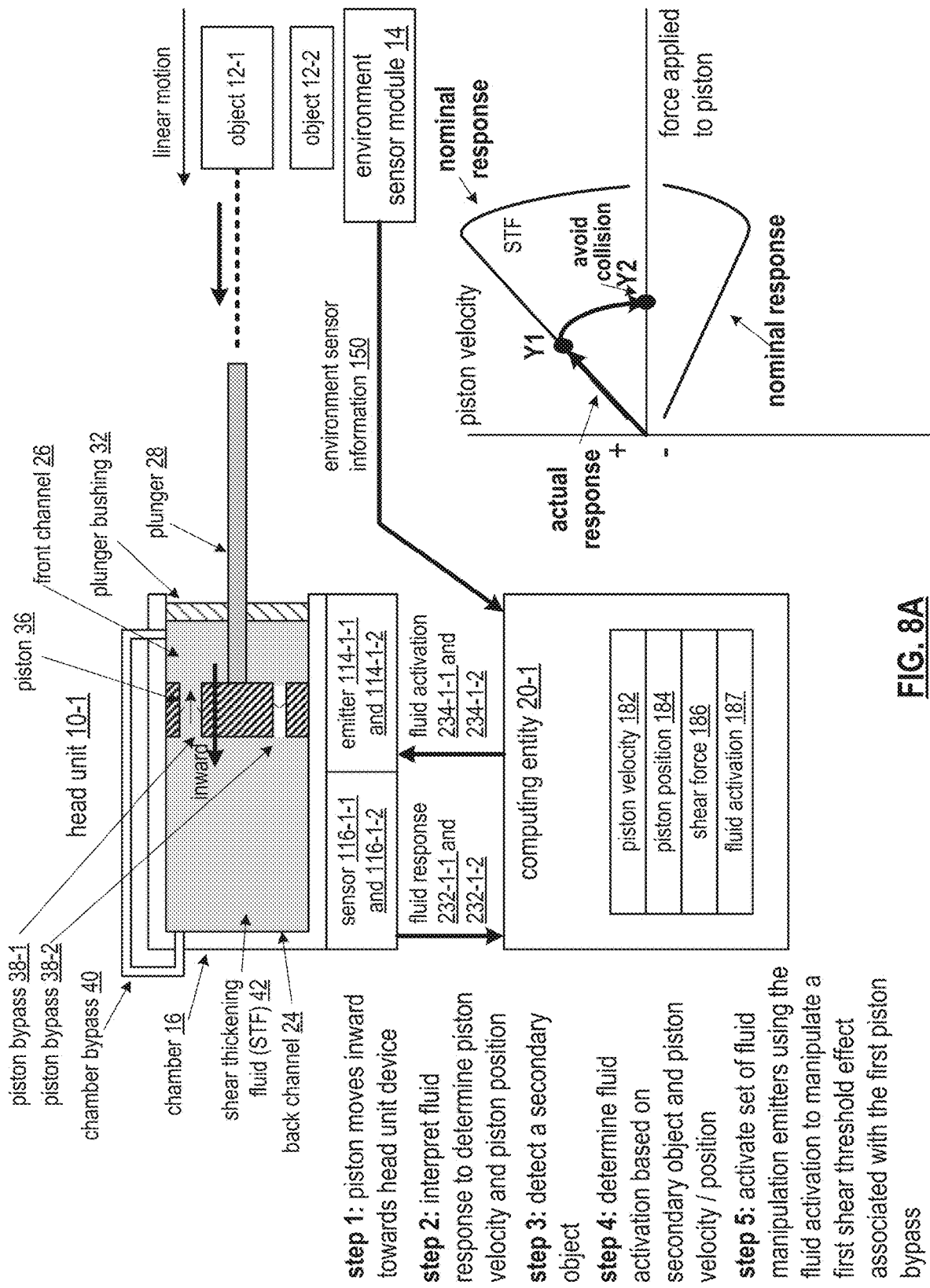
Figure 8B:
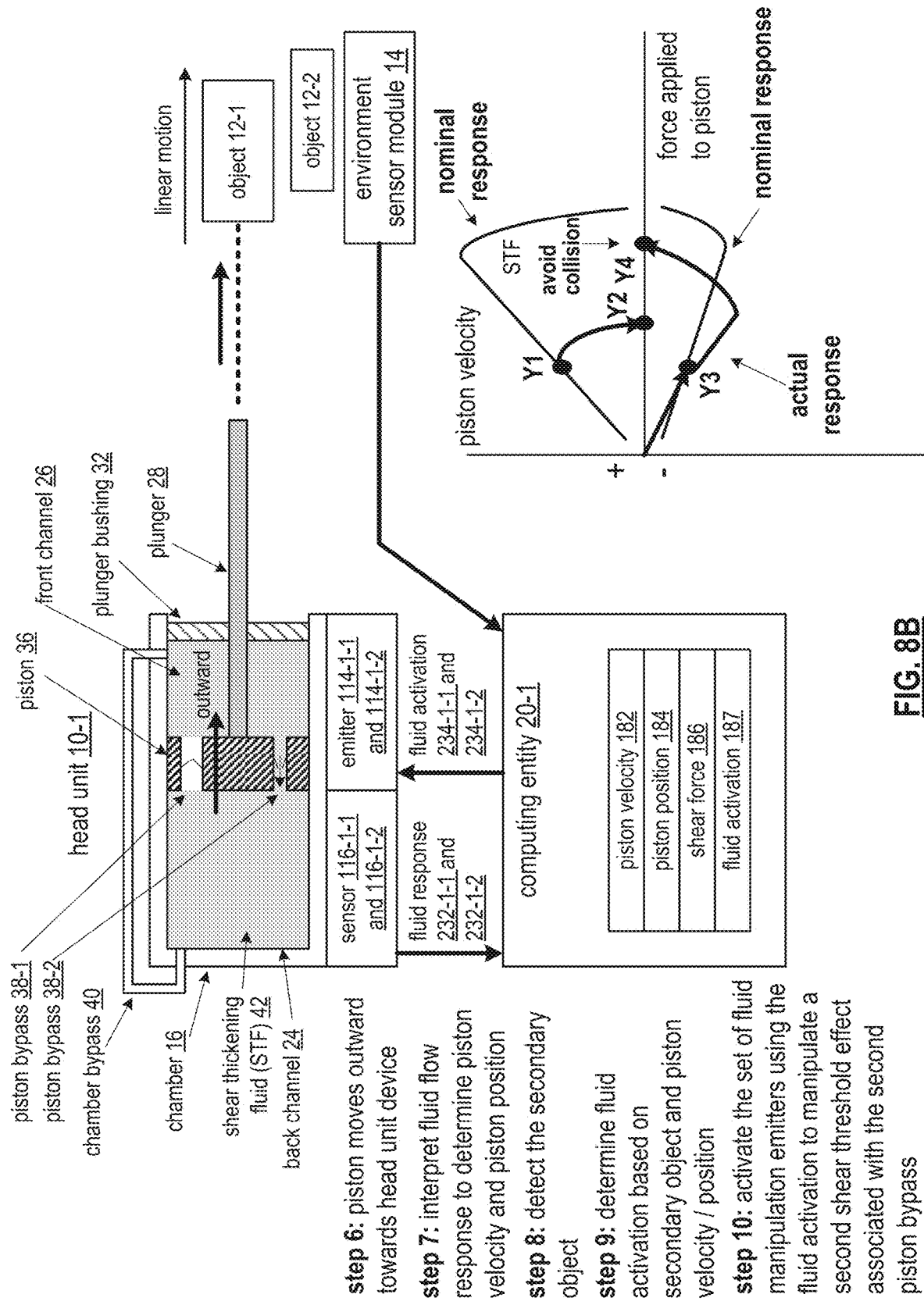
Figure 9A:
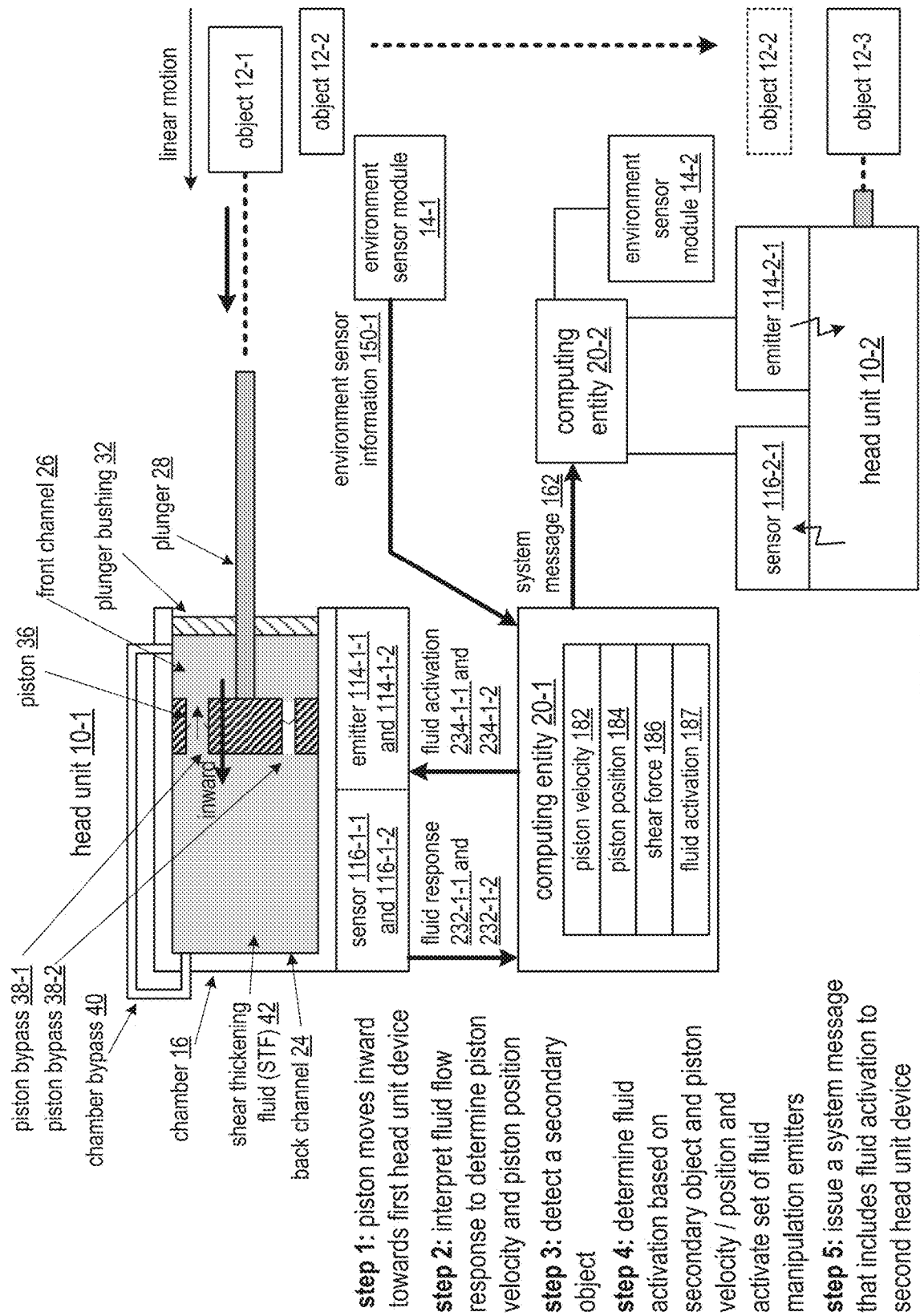
Figure 9B:
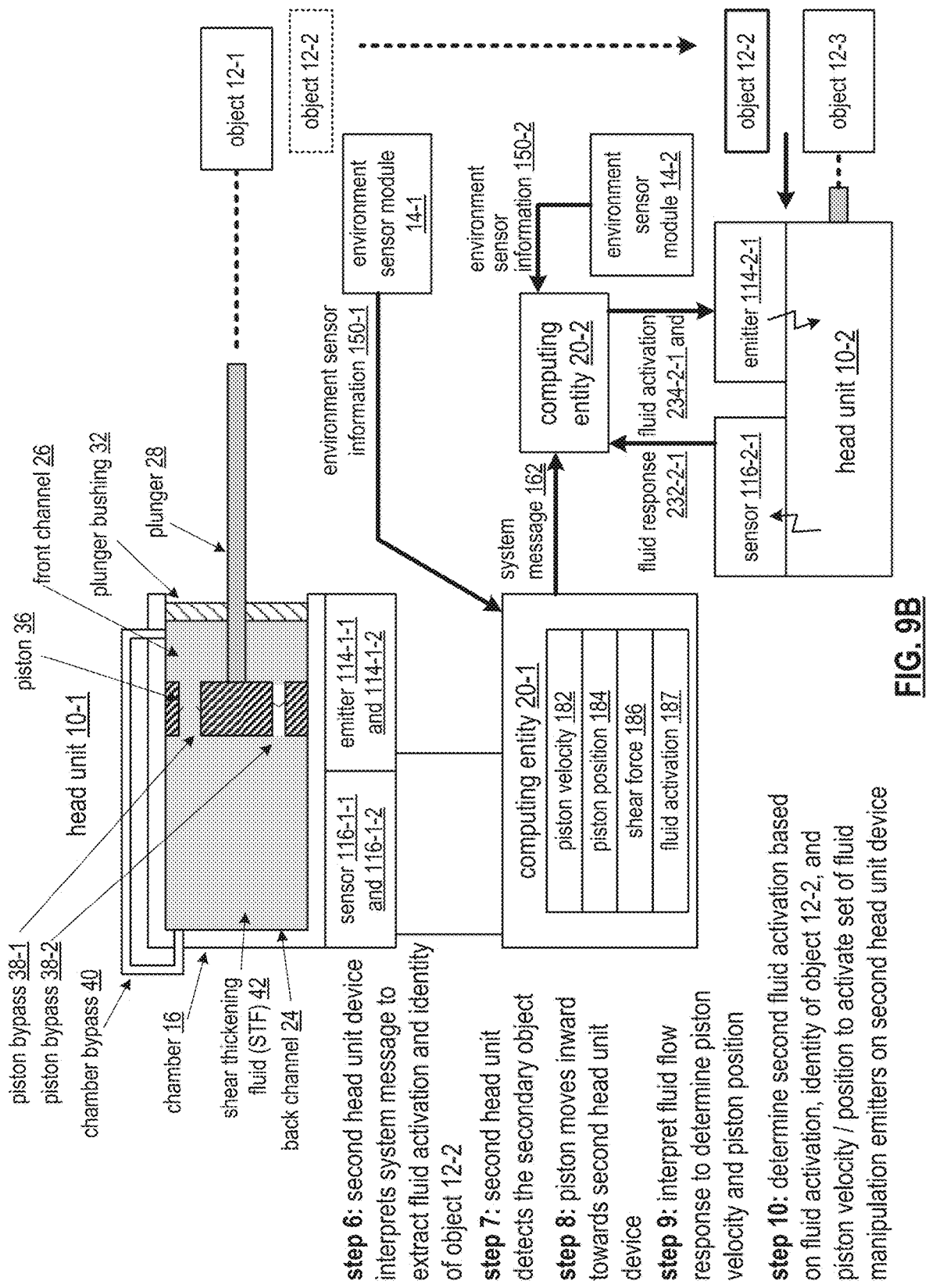

FIGS. 8A-8B are schematic block diagrams of another embodiment of a mechanical and computing system illustrating an example of controlling operational aspects in accordance with the present invention; and FIGS. 9A-9B are schematic block diagrams of another embodiment of a mechanical and computing system illustrating an example of controlling operational aspects in accordance with the present invention.

DETAILED DESCRIPTION OF THE INVENTION

Figure 1A:
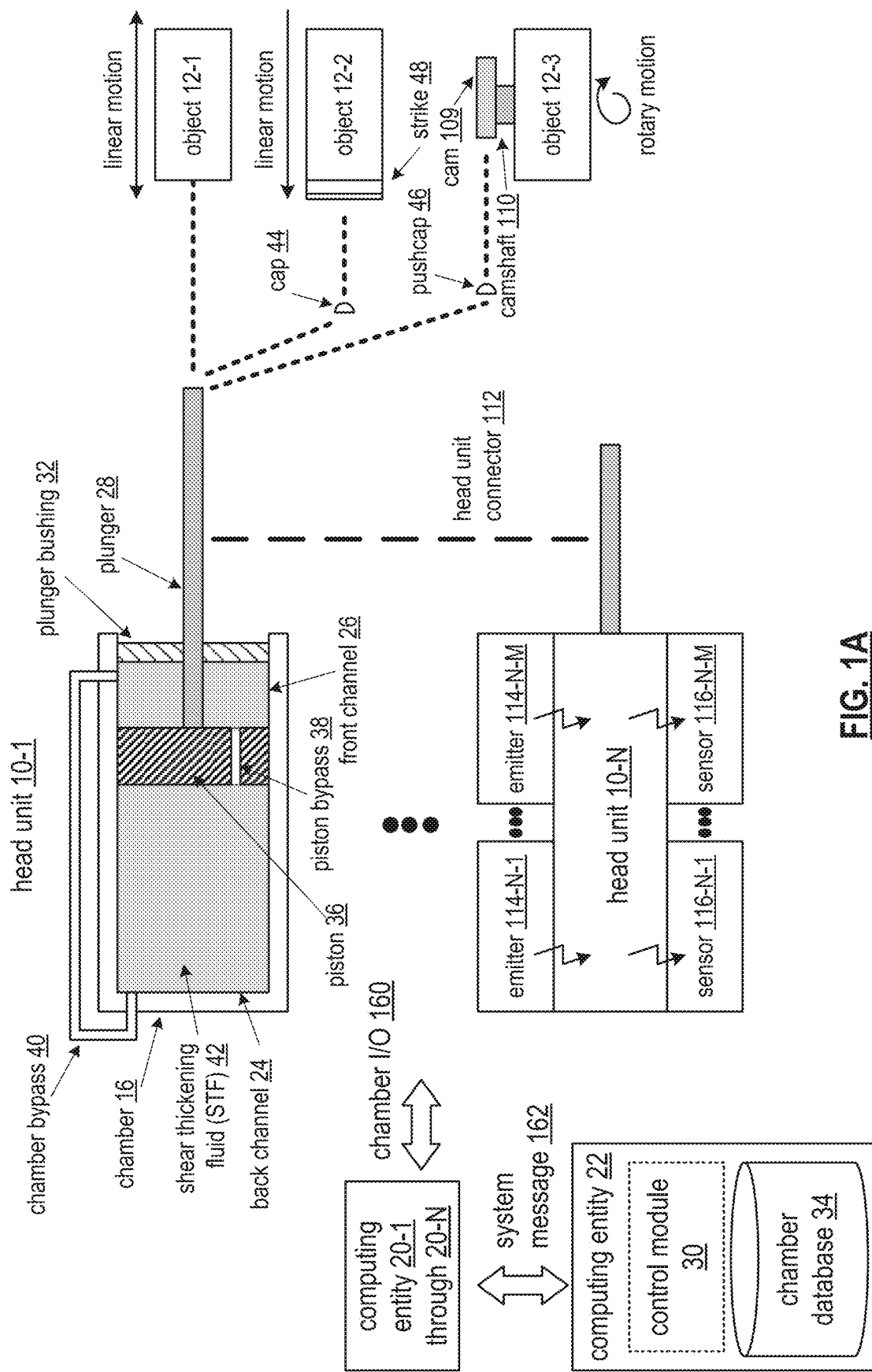
FIG. 1A is a schematic block diagram of an embodiment of a mechanical and computing system in accordance with the present invention.

FIG. 1A is a schematic block diagram of an embodiment of a mechanical and computing system that includes a set of head units 10-1 through 10-N, objects 12-1 through 12-3, computing entities 20-1 through 20-N associated with the head units 10-1 through 10-N, and a computing entity 22. The objects include any object that has mass and moves. Examples of an object include a door, an aircraft wing, a portion of a building support mechanism, and a particular drivetrain, etc.

The cross-sectional view of FIG. 1A illustrates a head unit that includes a chamber 16, a piston 36, a plunger 28, a plunger bushing 32, and a chamber bypass 40. The chamber 16 contains a shear thickening fluid (STF) 42. The chamber 16 includes a back channel 24 and a front channel 26, where the piston partitions the back channel 24 and the front channel 26. The piston 36 travels axially within the chamber 16. The chamber 16 may be a cylinder or any other shape that enables movement of the piston 36 and compression of the STF 42. The STF 42 is discussed in greater detail with reference to FIGS. 1B and 1C.

The plunger bushing 32 guides the plunger 28 into the chamber 16 in response to force from the object 12-1. The plunger bushing 32 facilitates containment of the STF within the chamber 16. The plunger bushing 32 remains in a fixed position relative to the chamber 16 when the force from the object moves the piston 36 within the chamber 16. In an embodiment the plunger bushing 32 includes an O-ring between the plunger bushing 32 and the chamber 16. In another embodiment the plunger bushing 32 includes an O-ring between the plunger bushing 32 and the plunger 28.

The piston 36 includes a piston bypass 38 between opposite sides of the piston to facilitate flow of a portion the STF between the opposite sides of the piston (e.g., between the back channel 24 and the front channel 26) when the piston travels through the chamber in an inward or an outward direction.

Alternatively, or in addition to, the chamber bypass 40 is configured between opposite ends of the chamber 16, wherein the chamber bypass 40 facilitates flow of a portion of the STF between the opposite ends of the chamber when the piston travels through the chamber in the inward or outward direction (e.g., between the back channel 24 and the front channel 26).

In alternative embodiments, the piston bypass 38 and the chamber bypass 40 includes mechanisms to enable STF flow in one direction and not an opposite direction. In further alternative embodiments, a control valve within the piston bypass 38 and/or the chamber bypass 40 controls the STF flow between the back channel 24 and the front channel 26. Each bypass includes one or more of a one-way check valve and a variable flow valve.

The plunger 28 is operably coupled to a corresponding object by one of a variety of approaches. A first approach includes a direct connection of the plunger 28 to the object 12-1 such that linear motion in any direction couples from the object 12-1 to the plunger 28. A second approach includes the plunger 28 coupled to a cap 44 which receives a one way force from a strike 48 attached to the object 12-2. A third approach includes a pushcap 46 that receives a force from a rotary-to-linear motion conversion component that is attached to the object 12-3. In an example, the object 12-3 is connected to a camshaft 110 which turns a cam 109 to strike the pushcap 46.

In an embodiment, two or more of the head units are coupled by a head unit connector 112. When so connected, actuation of a piston in a first head unit is essentially replicated in a piston of a second head unit. The head unit connector 112 includes a mechanical element between plungers of the two or more head units and/or direct connection of two or more plungers to a common object. For example, plunger 28 of head unit 10-1 and plunger 28 of head unit 10-2 are directly connected to object 12-1 when utilizing a direct connection.

Further associated with each head unit is a set of emitters and a set of sensors. For example, head unit 10-N includes a set of emitters 114-N-1 through 114-N-M and a set of sensors 116-N-1 through 116-N-M. Emitters includes any type of energy and or field emitting device to affect the STF, either directly or indirectly via other nanoparticles suspended in the STF. Examples of emitter categories include light, audio, electric field, magnetic field, wireless field, etc. Specific examples of fluid manipulation emitters include a variable flow valve associated with a bypass or injector or similar, a mechanical vibration generator, an image generator, a light emitter, an audio transducer, a speaker, an ultrasonic sound transducer, an electric field generator, a magnetic field generator, and a radio frequency wireless field transmitter. Specific examples of magnetic field emitters include a Helmholtz coil, a Maxwell coil, a permanent magnet, a solenoid, a superconducting electromagnet, and a radio frequency transmitting coil.

Sensors include any type of energy and/or field sensing device to output a signal that represents a reaction, motion or position of the STF. Examples of sensor categories include bypass valve position, mechanical position, image, light, audio, electric field, magnetic field, wireless field, etc. Specific examples of fluid flow sensors include a valve opening detector associated with the chamber 16 or any type of bypass (e.g., piston bypass 38, chamber bypass 40, a reservoir injector, or similar), a mechanical position sensor, an image sensor, a light sensor, an audio sensor, a microphone, an ultrasonic sound sensor, an electric field sensor, a magnetic field sensor, and a radio frequency wireless field sensor. Specific examples of magnetic field sensors include a Hall effect sensor, a magnetic coil, a rotating coil magnetometer, an inductive pickup coil, an optical magnetometry sensor, a nuclear magnetic resonance sensor, and a caesium vapor magnetometer.

The computing entities 20-1 through 20-N are discussed in detail with reference to FIG. 2A. The computing entity 22 includes a control module 30 and a chamber database 34 to facilitate storage of history of operation, desired operations, and other aspects of the system.

In an example of operation, the head unit 10-1 controls motion of the object 12-1 and includes the chamber 16 filled at least in part with the shear thickening fluid 42, the piston 36 housed at least partially radially within the chamber 16, and the piston 36 is configured to exert pressure against the shear thickening fluid 42 in response to movement of the piston 36 from a force applied to the piston from the object 12-1. The movement of the piston 36 includes one of traveling through the chamber 16 in an inward direction or traveling through the chamber 16 in an outward direction. The STF is configured to have a decreasing viscosity in response to a first range of shear rates and an increasing viscosity in response to a second range of shear rates.

The shear thickening fluid 42 (e.g., dilatant non-Newtonian fluid) has nanoparticles of a specific dimension that are mixed in a carrier fluid or solvent. Force applied to the shear thickening fluid 42 results in these nanoparticles stacking up, thus stiffening and acting more like a solid than a flowable liquid when a shear threshold is reached. In particular, viscosity of the shear thickening fluid 42 rises significantly when shear rate is increased to a point of the shear threshold. The relationship between viscosity and shear rates is discussed in greater detail with reference to FIGS. 1A and 1B.

In another example of operation, the object 12-1 applies an inward motion force on the plunger 28 which moves the piston 36 in words within the chamber 16. As the piston moves inward, shear rate of the shear thickening fluid 42 changes. A sensor 116-1-1 associated with the chamber 16 of the head unit 10-1 outputs chamber I/O 160 to the computing entity 20-1, where the chamber I/O 160 includes a movement data associated with the STF 42 as a result of the piston 36 moving inwards. Having received the chamber I/O 160, the computing entity 20-1 interprets the chamber I/O 160 to reproduce the movement data.

The computing entity 20-1 outputs the movement data as a system message 162 to the computing entity 22. The control module 30 stores the movement data in the chamber database 34 and interprets the movement data to determine whether to dynamically adjust the viscosity of the shear thickening fluid. Dynamic adjustment of the viscosity results in dynamic control of the movement of the piston 36, the plunger 28, and ultimately the object 12-1. Adjustment of the viscosity affects velocity, acceleration, and position of the piston 36.

The control module 30 determines whether to adjust the viscosity based on one or more desired controls of the object 12-1. The desired controls include accelerating, deaccelerating, abruptly stopping, continuing on a current trajectory, continuing at a constant velocity, or any other movement control. For example, the control module 30 determines to abruptly stop the movement of the object 12-1 when the object 12-1 is a door and the door is detected to be closing at a rate above a maximum closing rate threshold level and when the expected shear rate versus viscosity of the shear thickening fluid 42 requires modification (e.g., boost the viscosity now to slow the door from closing too quickly).

When determining to modify the viscosity, the control module 30 outputs a system message 162 to the computing entity 20-1, where the system message 162 includes instructions to immediately boost the viscosity beyond the expected shear rate versus viscosity of the shear thickening fluid 42. Alternatively, the system message 162 includes specific information on the relationship of viscosity versus shear rate.

Having received the system message 162, the computing entity 20-1 determines a set of adjustments to make with regards to the shear thickening fluid 42 within the chamber 16. The set of adjustments includes one or more of adjusting STF 42 flow through the chamber bypass 40, adjusting STF 42 flow through the piston bypass 38, and activating an emitter of a set of emitters 114-1-1 through 114-N-1. The flow adjustments include regulating within a flow range, stopping, starting, and allowing in one particular direction. For example, the computing entity 20-1 determines to activate emitter 114-1-1 to produce a magnetic field such as to interact with magnetic nanoparticles within the STF 42 to raise the viscosity. The computing entity 20-1 issues another chamber I/O 160 to the emitter 114-1-1 to initiate a magnetic influence process to boost the viscosity of the STF 42.

In an alternative embodiment, the computing entity 22 issues another system message 162 to two or more computing entities (e.g., 20-1 and 20-2) to boost the viscosity for corresponding head units 10-1 and 10-2 when the head unit connector 112 connects head units 10-1 and 10-2 and both head units are controlling the motion of the object 12-1. For instance, one of the head units informs the computing entity 22 that the object 12-1 is moving too quickly inward and the predicted stopping power of the expected viscosity versus shear rate of the STF 42 of the head unit, even when boosted, will not be enough to slow the object 12-1 to a desired velocity or position. When informed that one head unit, even with a modified viscosity, is not enough to control the object 12-1, the control module 30 determines how many other head units (e.g., connected via the head unit connector 112) to apply and to dynamically modify the viscosity.

In yet another alternative embodiment, the computing entity 22 issues a series of system messages 162 to a set of computing entities associated with a corresponding set of head units to produce a cascading effect of altering of the viscosity of the STF 42 of each of the chambers 16 associated with the set of head units. For example, 3 head units are controlled by 3 corresponding computing entities to adjust viscosity in a time cascaded manner. For instance, head unit 10-1 abruptly changes the viscosity to attempt to slow the object 12-1 followed seconds later by head unit 10-2 abruptly changing the viscosity to attempt to further slow the object 12-1, followed seconds later by head unit 12-3 abruptly changing the viscosity to attempt to further slow the object 12-1.

In a still further alternative embodiment, the computing entity 22 conditionally issues each message of the series of system messages 162 to the set of computing entities associated with the corresponding set of head units to produce the cascading effect of altering of the viscosity of the STF 42 of each of the chambers 16 associated with the set of head units only when a most recent adaptation of viscosity is not enough to slow the object 12-1 with desired results. For example, the 3 head units are controlled by the 3 corresponding computing entities to adjust viscosity in a conditional time cascaded manner. For instance, head unit 10-1 abruptly changes the viscosity to attempt to slow the object 12-1 followed seconds later by head unit 10-2 abruptly changing the viscosity if head unit 10-1 was unsuccessful to attempt to further slow the object 12-1, followed seconds later by head unit 12-3 abruptly changing the viscosity if head unit 10-2 was unsuccessful to attempt to further slow the object 12-1.

FIG. 1B is a graph of viscosity vs. shear rate for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

A relationship between compressive impulse (e.g., shear rate) and the viscosity of the shear thickening fluid is nonlinear and may comprise one or more inflection points as the piston travels within the chamber in response to different magnitudes of forces and different accelerations. The viscosity of the STF may also be a function of other influences, such as electric fields, acoustical waves, magnetic fields, and other similar influences. As a first example of a response of a shear thickening fluid, a first range of shear rates in zone A has a decreasing viscosity as the shear rate increases and then in a second range of shear rates in zone B the viscosity increases abruptly. As a second example of a response of a diluted shear thickening fluid, the first range of shear rates in zone A extends to a higher level of shear rates with the decreasing viscosity and then in the still higher second range of shear rates in zone B the viscosity increases abruptly similar to that of the shear thickening include.

The shear thickening fluid includes particles within a solvent. Examples of particles of the shear thickening fluid include oxides, calcium carbonate, synthetically occurring minerals, naturally occurring minerals, polymers, or a mixture thereof. Further examples of the particles of the shear thickening fluid include $SiO_2$, polystyrene, or polymethylmethacrylate.

The particles are suspended in a solvent. Example components of the solvent include water, a salt, a surfactant, and a polymer. Further example components of the solvent include ethylene glycol, polyethylene glycol, ethanol, silicon oils, phenyltrimethicone or a mixture thereof. Example particle diameters range from less than 100 μm to less than 1 millimeter. In an instance, the shear thickening fluid is made of silica particles suspended in polyethylene glycol at a volume fraction of approximately 0.57 with the silica particles having an average particle diameter of approximately 446 nm. As a result, the shear thickening fluid exhibits a shear thickening transition at a shear rate of approximately $10^2$-$10^3$ s$^{-1}$.

A volume fraction of particles dispersed within the solvent distinguishes the viscosity versus shear rate of different shear thickening fluids. The viscosity of the STF changes in response to the applied shear stress. At rest and under weak applied shear stress, a STF may have a fairly constant or even slightly decreasing viscosity because the random distribution of particles causes the particles to frequently collide. However, as a greater shear stress is applied so that the shear rate increases, the particles flow in a more streamlined manner. However, as an even greater shear stress is applied so that the shear rate increases further, a hydrodynamic coupling between the particles may overcome the interparticle forces responsible for Brownian motion. The particles may be driven closer together, and the microstructure of the colloidal dispersion may change, so that particles cluster together in hydroclusters.

The viscosity curve of the STF can be fine-tuned through changes in the characteristics of the particles suspended in the solvent. For example, the particles shape, surface chemistry, ionic strength, and size affect the various interparticle forces involved, as does the properties of the solvent. However, in general, hydrodynamic forces dominate at a high shear stress, which also makes the addition of a polymer attached to the particle surface effective in limiting clumping in hydroclusters. Various factors influence this clumping behavior, including, fluid slip, adsorbed ions, surfactants, polymers, surface roughness, graft density (e.g., of a grafted polymer), molecular weight, and solvent, so that the onset of shear thickening can be modified. In general, the onset of shear thickening can be slowed by the introduction of techniques to prevent the clumping of particles. For example, influencing the STF with emissions from an emitter in proximal location to the chamber.

FIG. 1C is a graph of piston velocity vs. force applied to the piston for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

An example curve for a shear thickening fluid indicates that as more force is applied to the piston in zone A, a higher piston velocity is realized until the corresponding transition to zone B occurs where the shear threshold affect takes hold and the viscosity abruptly increases significantly. When the viscosity increases abruptly, the piston velocity slows back down and may even stop.

Another example curve for a diluted shear thickening fluid indicates that as more force is applied to the piston in zone A, an even higher piston velocity is realized until the corresponding transition to zone B occurs where the shear threshold affect takes hold and the viscosity abruptly increases significantly. When the viscosity increases abruptly, the piston velocity slows back down and may even stop.

Figure 2A:
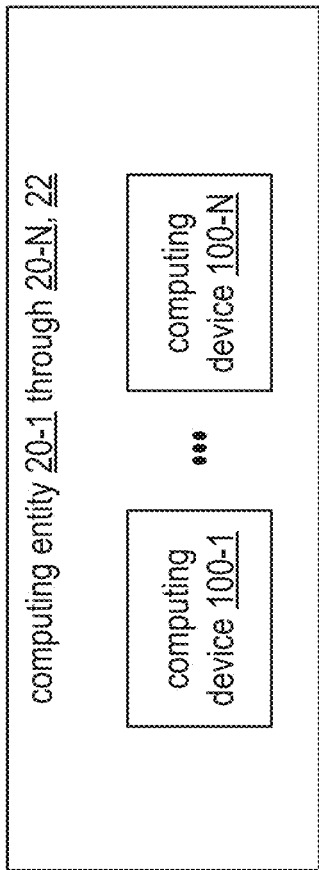
FIG. 2A is a schematic block diagram of an embodiment of a computing entity of a computing system in accordance with the present invention.

FIG. 2A is a schematic block diagram of an embodiment of the computing entity (e.g., 20-1 through 20-N; and 22) of the mechanical and computing system of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
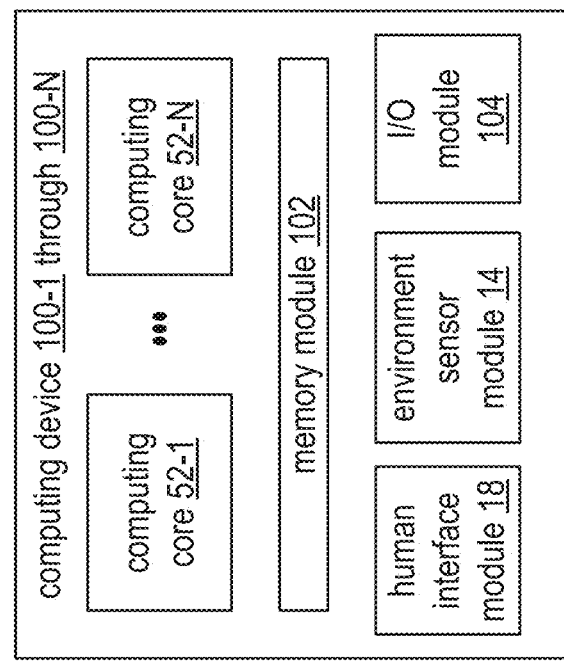
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
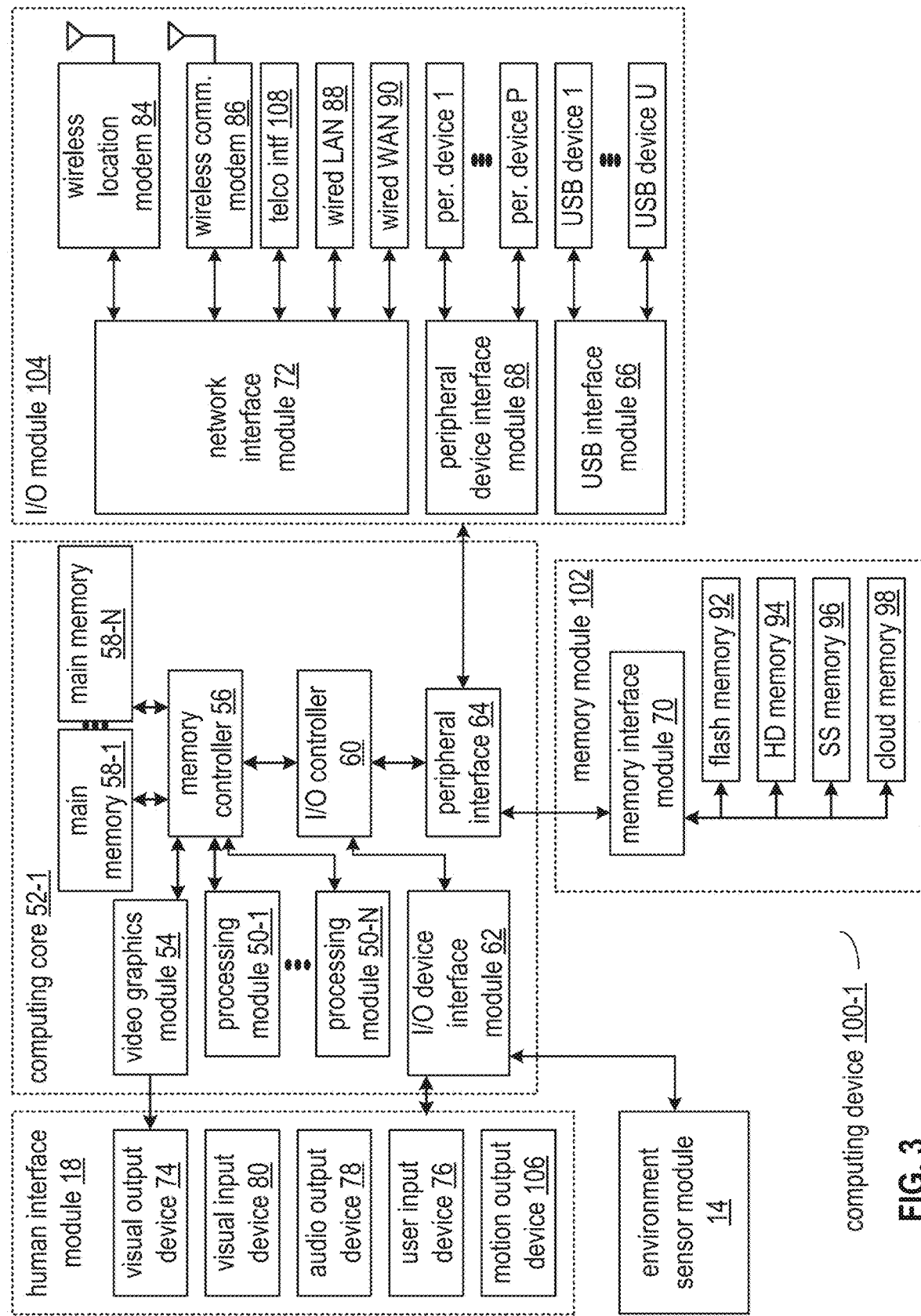
FIG. 3 is a schematic block diagram of another embodiment of a computing device of a computing system in accordance with the present invention.

FIG. 3 is a schematic block diagram of another embodiment of the computing device 100-1 of the mechanical and computing system of FIG. 1 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
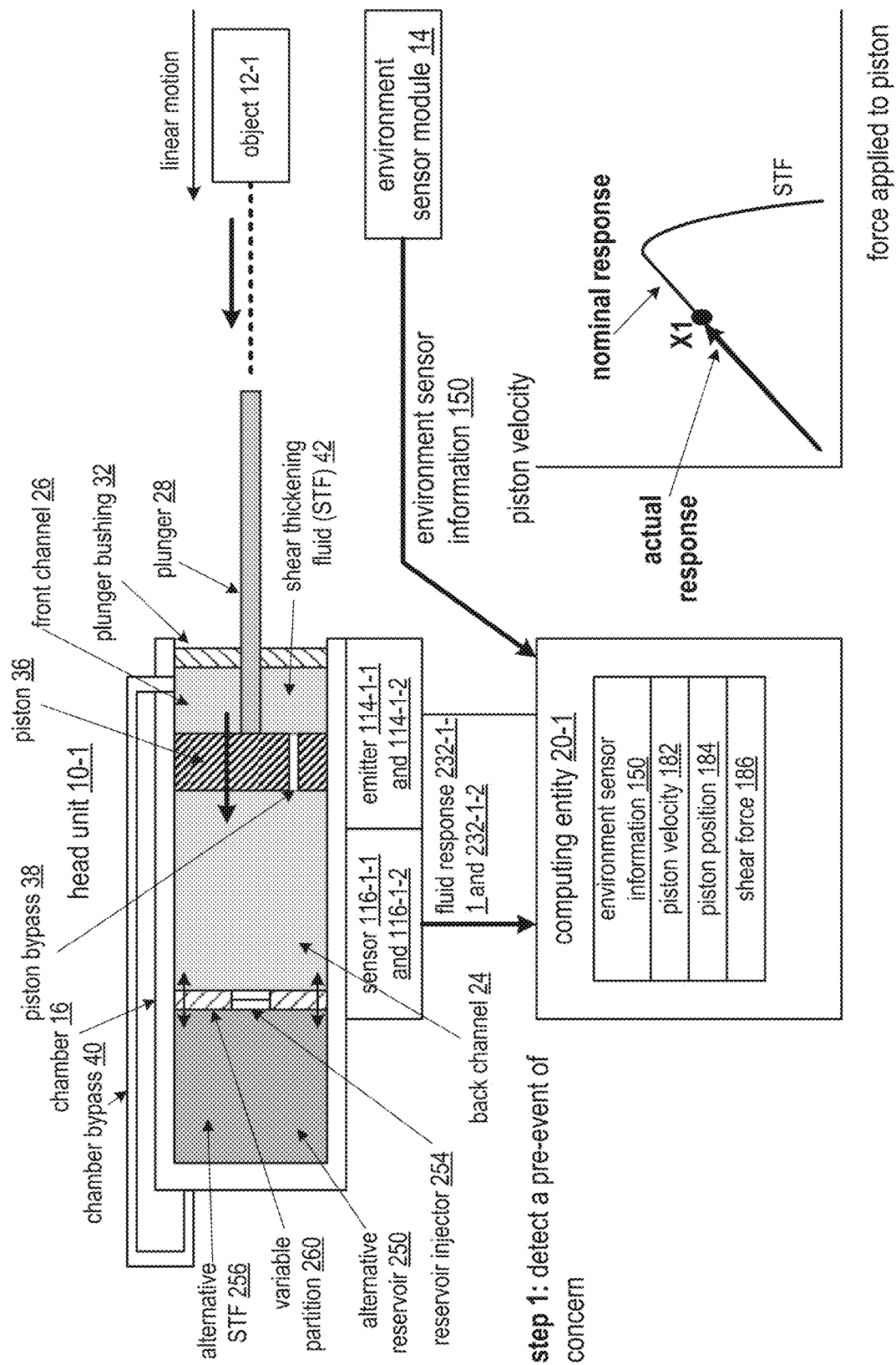
FIGS. 5A-5B are schematic block diagrams of another embodiment of a mechanical and computing system illustrating an example of controlling operational aspects in accordance with the present invention.
Figure 5B:
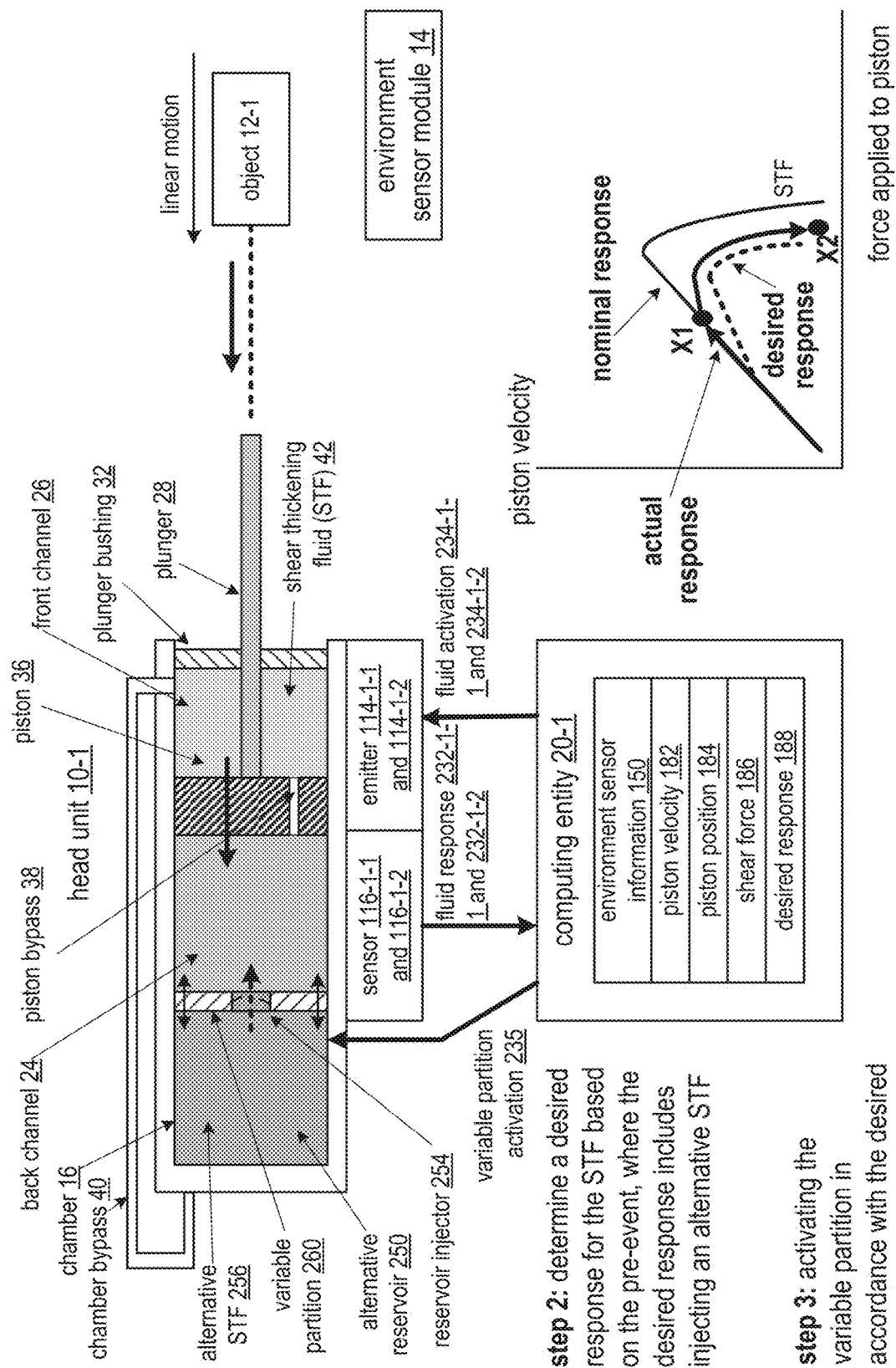

FIGS. 5A-5B are schematic block diagrams of another embodiment of a mechanical and computing system illustrating an example of controlling operational aspects. The mechanical and computing system includes the head unit 10-1 of FIG. 1, the object 12-1 of FIG. 1, the environment sensor module 14 of FIG. 2B, and the computing entity 20-1 of FIG. 1.

In particular, the head unit 10-1 for controlling motion of the object 12-1 includes a chamber 16 filled at least in part with a shear thickening fluid (STF) 42. The head unit 10-1 further includes a piston 36 housed at least partially radially within the chamber 16. The piston 36 is configured to exert pressure against the shear thickening fluid 42 in response to movement of the piston 36 from a force applied to the piston 36 from the object 12-1.

The movement of the piston 36 includes one of traveling through the chamber 16 in an inward direction and traveling through the chamber 16 in an outward direction. The STF is configured to have a decreasing viscosity in response to a first range of shear rates and an increasing viscosity in response to a second range of shear rates. The head unit 10-1 further includes a set of fluid flow sensors 116-1-1 and 116-1-2 positioned proximal to the chamber 16. The set of fluid flow sensors provide a fluid response from the STF.

The head unit 10-1 further includes a set of fluid manipulation emitters 114-1-1 and 114-1-2 proximal to the chamber 16. The set of fluid manipulation emitters provide a fluid activation to the STF 42.

The chamber 16 further includes a variable partition 260 within the chamber between the piston and a closed-end of the chamber to dynamically affect volume of the chamber based on activation of the variable partition. The chamber includes a piston compartment and an alternative reservoir 250. The piston compartment includes a back channel 24 on an inward side of the piston 36 and a front channel 26 on the outward side of the piston 36. The alternative reservoir is filled at least in part with an alternative STF 256. The variable partition includes a reservoir injector 254. The reservoir injector 254 couples the alternative reservoir 250 to the piston compartment controlling the inflow of the alternative STF 256 from the alternative reservoir 250 to the piston compartment to mix with the STF.

FIG. 5A illustrates an example of operation of a method for the controlling the operational aspects. A first step of the example of operation includes the computing entity 20-1 interpreting environment sensor information 150 to detect a pre-event of concern. Examples of pre-events of concern include a temperature reaching a threshold temperature level, a pressure reaching a pressure threshold level, movement, sound identity of an associated object, a likely collision detection, a proximity detection, a drop detection, a gun muzzle flash, a seismic event, a cable break, a belt slippage, and unfavorable chain tension, etc. In an instance, the environment sensor module 14 includes the visual sensor 122 of FIG. 4 and produces the environment sensor information 150 to include an image of a first vehicle that is about to collide with a second vehicle associated with the object 12-1, where the object 12-1 includes a bumper on the second vehicle.

The detecting of the pre-event of concern further includes the computing entity 20-1 interpreting fluid response 232-1-1 from fluid flow sensor 116-1-1 and fluid response 232-1-2 from fluid flow sensor 116-1-2 to produce piston velocity 182 and piston position 184. The detecting of the pre-event of concern further includes the computing entity 20-1 determining a shear force 186 based on the piston velocity 182 and piston position 184. The determining the shear force based on the piston velocity and the piston position includes one approach of a variety of approaches. A first approach includes extracting the shear force directly from the fluid response when one or more sensors of the set of fluid flow sensors outputs a shear force encoded signal. For example, the computing entity 20-1 extracts the shear force 186 directly from the glued responses 232-1-1 and 232-1-2. In an instance, the shear force 186 reveals the piston velocity versus force applied to the piston curve as illustrated in FIG. 5A, where at a current time of interpreting the response, the force and piston velocity are at a point X1.

A second approach includes determining the shear force utilizing the piston velocity and stored data for piston velocity verses shear force for the STF. For example, the computing entity 20-1 compares the velocity and position to stored data for instantaneous velocity and position verses shear force for the STF 42.

A third approach includes determining the shear force utilizing the piston position and stored data for piston position verses shear force for the STF within the chamber. For example, the computing entity 20-1 compares the velocity and position to stored data for instantaneous velocity and position verses shear force for the STF 42.

FIG. 5B further illustrates the example of operation, where having detected the pre-event of concern, in a second step the computing entity 20-1 determines a desired response 188 for the shear thickening fluid of the head unit device for controlling motion of the object 12-1 based on the pre-event of concern. For example, the computing entity 20-1 determines to rapidly increase the viscosity of the STF 42 to brace for an impact from a certain collision from the second vehicle upon the object 12-1 (e.g., bumper of the first vehicle) when the pre-event of concern indicates a high confidence of collision. The desired response is represented in the force versus piston velocity diagram of FIG. 5B.

The desired response includes a variety of approaches. A first approach includes injecting the alternative STF 256 into the back channel 24 by way of the reservoir injector 254. A second approach includes moving the variable partition 260 towards the piston 36 to increase the forces on the STF 42. A third approach includes both moving the variable partition and injecting the alternative STF.

Having determined the desired response for the STF, a third step of the example of operation includes the computing entity 20-1 activating the variable partition 260 in accordance with the desired response for the STF. For example, the computing entity 20-1 outputs a variable partition activation 235 to the reservoir injector 254 of the variable partition 260 to open the reservoir injector 254 to enable inflow of the alternative STF 256 into the back chamber 24.

Alternatively, or in addition to, the computing entity 20-1 further determines, via the fluid flow sensors, the piston velocity 182 and the piston position 184 to determine whether to apply a further activation of the variable partition approach to either further slow down the piston or to speed it up. When applying corrections, the actual response is slowed to a dead stop at a time X2 as indicated in graph of FIG. 5B.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth memory element, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 6A:
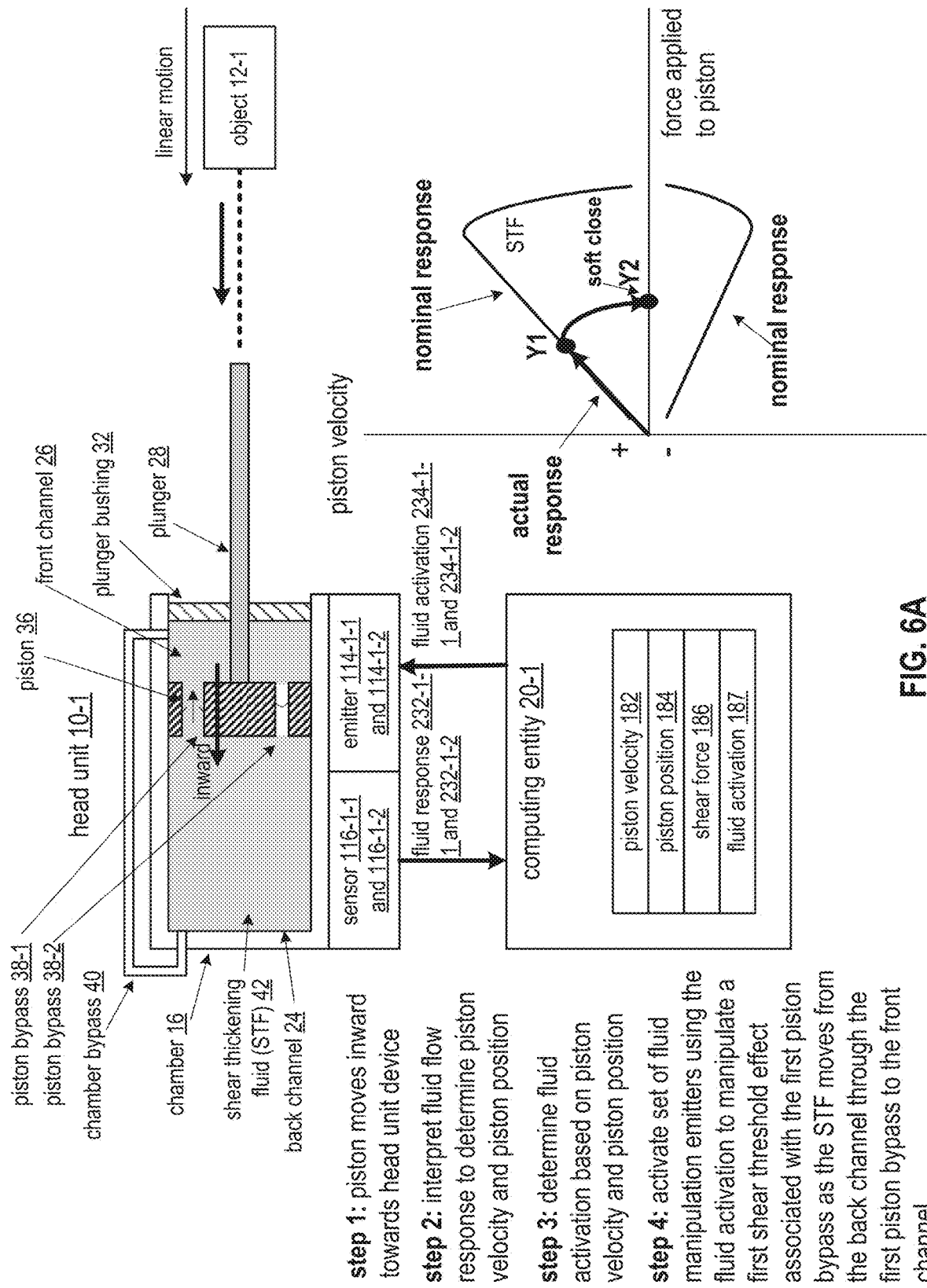
FIGS. 6A-6B are schematic block diagrams of another embodiment of a mechanical and computing system illustrating an example of controlling operational aspects in accordance with the present invention.
Figure 6B:
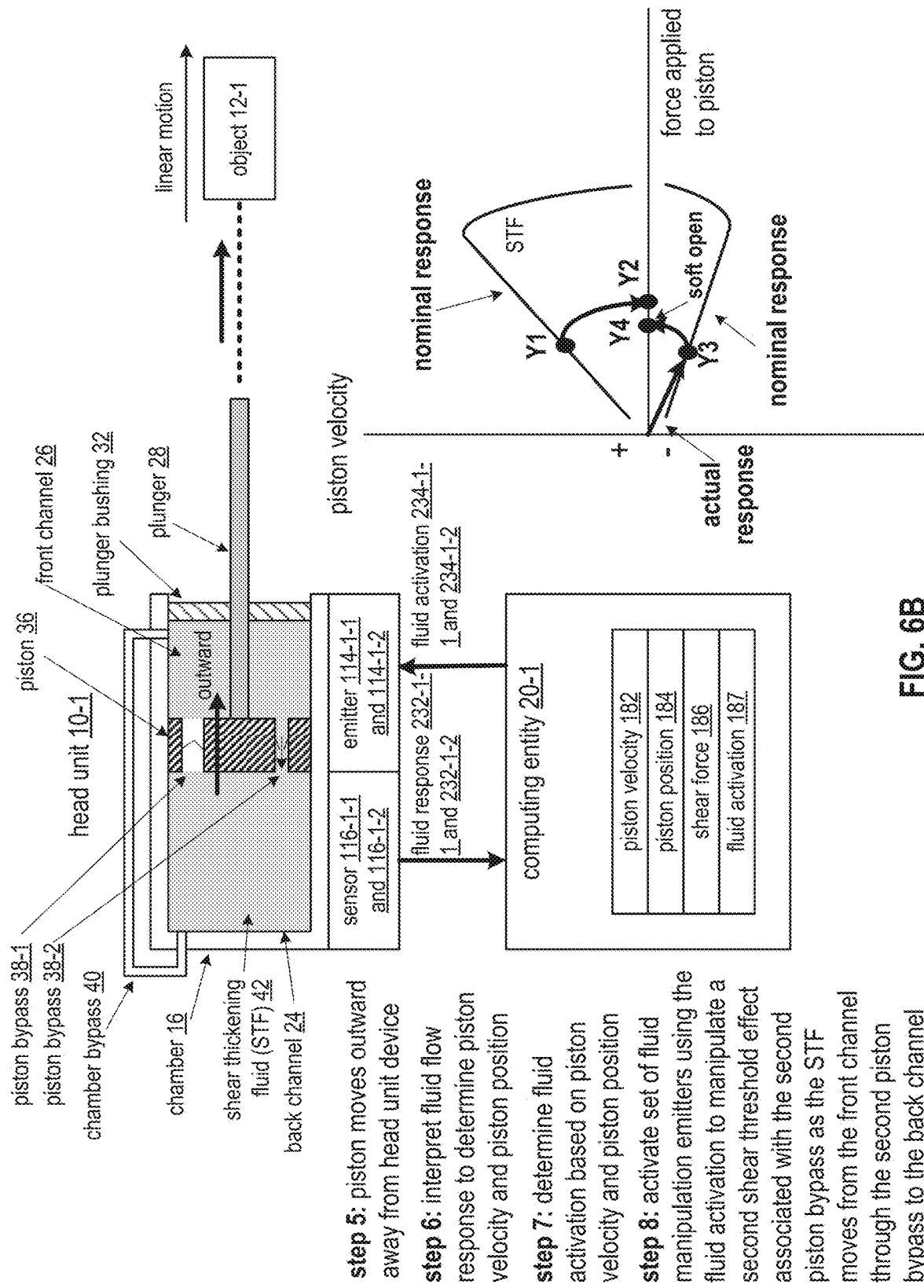

FIGS. 6A-6B are schematic block diagrams of another embodiment of a mechanical and computing system illustrating an example of controlling operational aspects. The mechanical and computing system includes the head unit 10-1 of FIG. 1, the object 12-1 of FIG. 1, and the computing entity 20-1 of FIG. 1.

In particular, the head unit 10-1 for controlling motion of the object 12-1 includes a chamber 16 filled at least in part with a shear thickening fluid (STF) 42. The chamber includes a back channel 24 on an inward side of the piston 36 and a front channel 26 on the outward side of the piston 36. The head unit 10-1 further includes a piston 36 housed at least partially radially within the chamber 16. The piston 36 is configured to exert pressure against the shear thickening fluid 42 in response to movement of the piston 36 from a force applied to the piston 36 from the object 12-1.

The movement of the piston 36 includes one of traveling through the chamber 16 in an inward direction and traveling through the chamber 16 in an outward direction. The STF is configured to have a decreasing viscosity in response to a first range of shear rates and an increasing viscosity in response to a second range of shear rates.

The piston 36 includes a first piston bypass 38-1 between opposite sides of the piston that controls flow of the STF between the opposite sides of the piston from the back channel 24 to the front channel 26 when the piston is traveling through the chamber in the inward direction to cause the STF to react with a first shear threshold effect. The piston 36 further includes a second piston bypass 38-2 between the opposite sides of the piston that controls flow of the STF between the opposite sides of the piston from the front channel 26 to the back channel 24 when the piston is traveling through the chamber in the outward direction to cause the STF to react with a second shear threshold effect;

The head unit 10-1 further includes a set of fluid flow sensors 116-1-1 and 116-1-2 positioned proximal to the chamber 16. The set of fluid flow sensors provide a fluid response from the STF 42. The head unit 10-1 further includes a set of fluid manipulation emitters 114-1-1 and 114-1-2 proximal to the chamber 16. The set of fluid manipulation emitters provide a fluid activation to at least one of the STF 42, the first piston bypass 38-1, and the second piston bypass 38-2.

FIG. 6A illustrates an example of operation of a method for the controlling the operational aspects. A first step of the example of operation includes the piston 36 moving inward towards the head unit 10-1 in response to a force from the object 12-1 through the plunger 28 to cause compression of the STF 42 in the back channel 24.

A second step of the example method of operation includes the computing entity 20-1 interpreting a fluid flow response from the set of fluid flow sensors to produce a piston velocity 182, a piston position 184, and a shear force 186 as previously discussed and as illustrated at time Y1 in the graph of FIG. 6A. Having produced the piston velocity, the piston position, and the sheer force, a third step of the example method of operation includes the computing entity 20-1 determining a fluid activation for the head unit device based on one or more of the piston velocity, the piston position, and the sheer force. The determining the fluid activation includes determining a desired response based on one or more of the piston velocity, the piston position, and the shear force. For example, the computing entity 20-1 determines to significantly increase the viscosity of the STF to affect a soft close of a door when the object 12-1 includes a door that is about to close too fast.

The determining the fluid activation further includes selecting a type of activation to utilize the fluid activation. Types of activation include directly affecting the viscosity and shear threshold effect of the STF by way of signals applied to the fluid manipulation emitters and controlling one of the first piston bypass 38-1 and second piston bypass 38-2 to increase or decrease shear force within the chamber which in turn affects viscosity of the STF. For example, the computing entity 20-1 selects further restricting the opening of the first piston bypass 38-1 to create more pressure in the back channel 24 to provide an actual response of force versus piston velocity as illustrated in the graph of FIG. 6A at a time Y2 when the door is to soft close.

Having determined the fluid activation, a fourth step of the example method of operation includes the computing entity 20-1 activating the set of fluid manipulation emitters 114-1-1 and 114-1-2 with the fluid activation 234-1-1 and 234-1-2 to manipulate the first shear threshold effect associated with the first piston bypass (e.g., to increase sheer force to move to the second range of shear rates such that the viscosity of the STF increases to slow down the door).

FIG. 6B further illustrates the example of operation of the method for the controlling the operational aspects. A fifth step of the example of operation includes the piston 36 moving outward away from the head unit 10-1 in response to a pulling force from the object 12-1 through the plunger 28 to cause compression of the STF 42 in the front channel 26.

A sixth step of the example method of operation includes the computing entity 20-1 further interpreting a fluid flow response from the set of fluid flow sensors to produce the piston velocity 182, the piston position 184, and the shear force 186 as previously discussed and as illustrated at time Y3 in the graph of FIG. 6A.

Having produced the piston velocity, the piston position, and the sheer force, a seventh step of the example method of operation includes the computing entity 20-1 determining the fluid activation for the head unit device based on one or more of the piston velocity, the piston position, and the shear force. The determining the fluid activation includes determining a desired response based on one or more of the piston velocity, the piston position, and the shear force. For example, the computing entity 20-1 determines to significantly increase the viscosity of the STF to affect a soft opening of the door when the object 12-1 includes the door that is about to open too fast and crush a backstop.

The determining the fluid activation further includes selecting the type of activation to utilize the fluid activation. For example, the computing entity 20-1 selects further restricting the opening of the second piston bypass 38-2 to create more pressure in the front channel 26 to provide an actual response of force versus piston velocity as illustrated in the graph of FIG. 6A at a time Y4 when the door is to soft open.

Having determined the fluid activation, an eighth step of the example method of operation includes the computing entity 20-1 activating the set of fluid manipulation emitters 114-1-1 and 114-1-2 with the fluid activation 234-1-1 and 234-1-2 to manipulate the second shear threshold effect associated with the second piston bypass 38-2 (e.g., to increase sheer force to move to the second range of shear rates such that the viscosity of the STF increases to slow down the door as it opens softly at an end of travel).

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 7A:
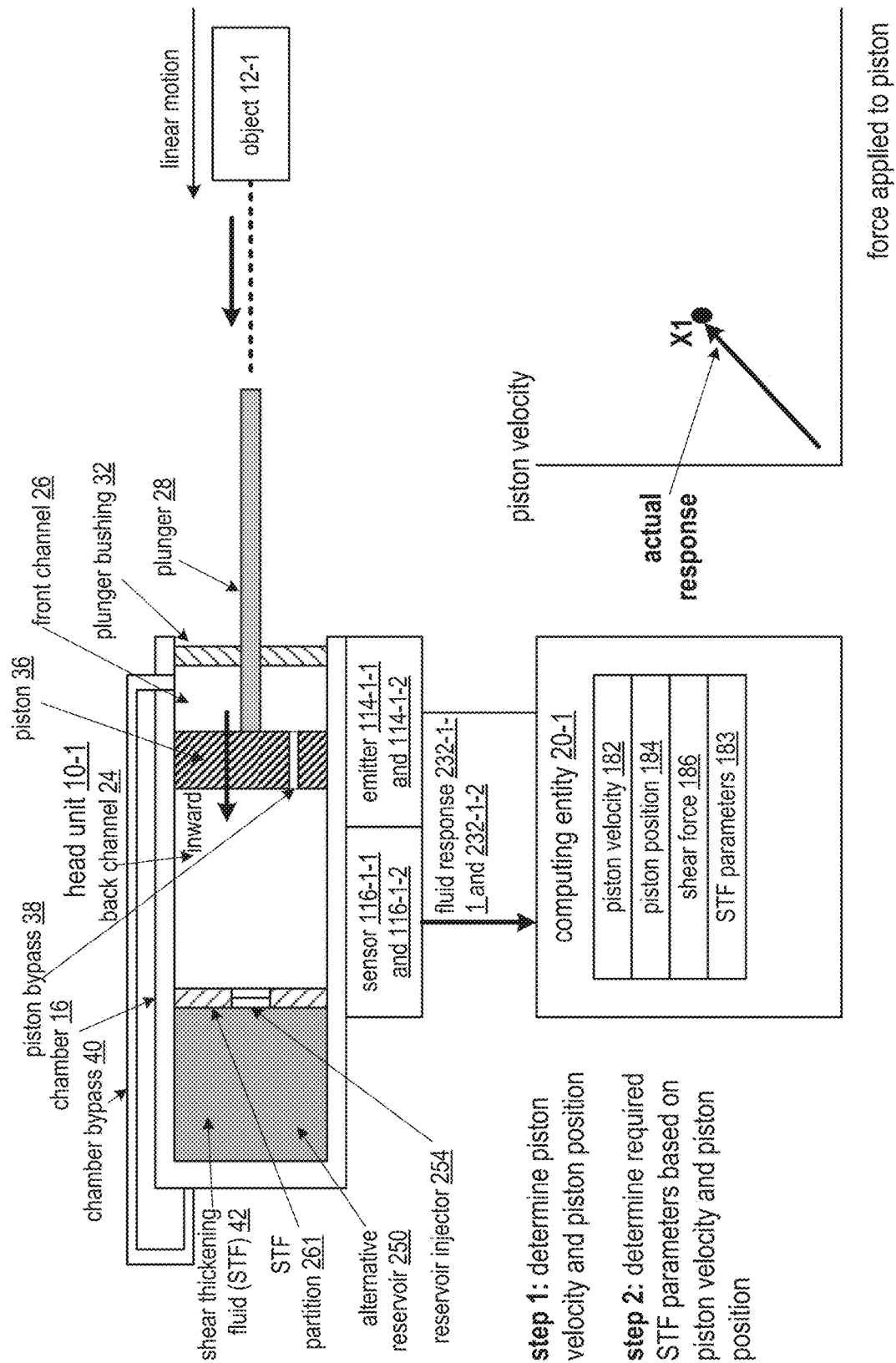
FIGS. 7A-7B are schematic block diagrams of another embodiment of a mechanical and computing system illustrating an example of controlling operational aspects in accordance with the present invention.
Figure 7B:
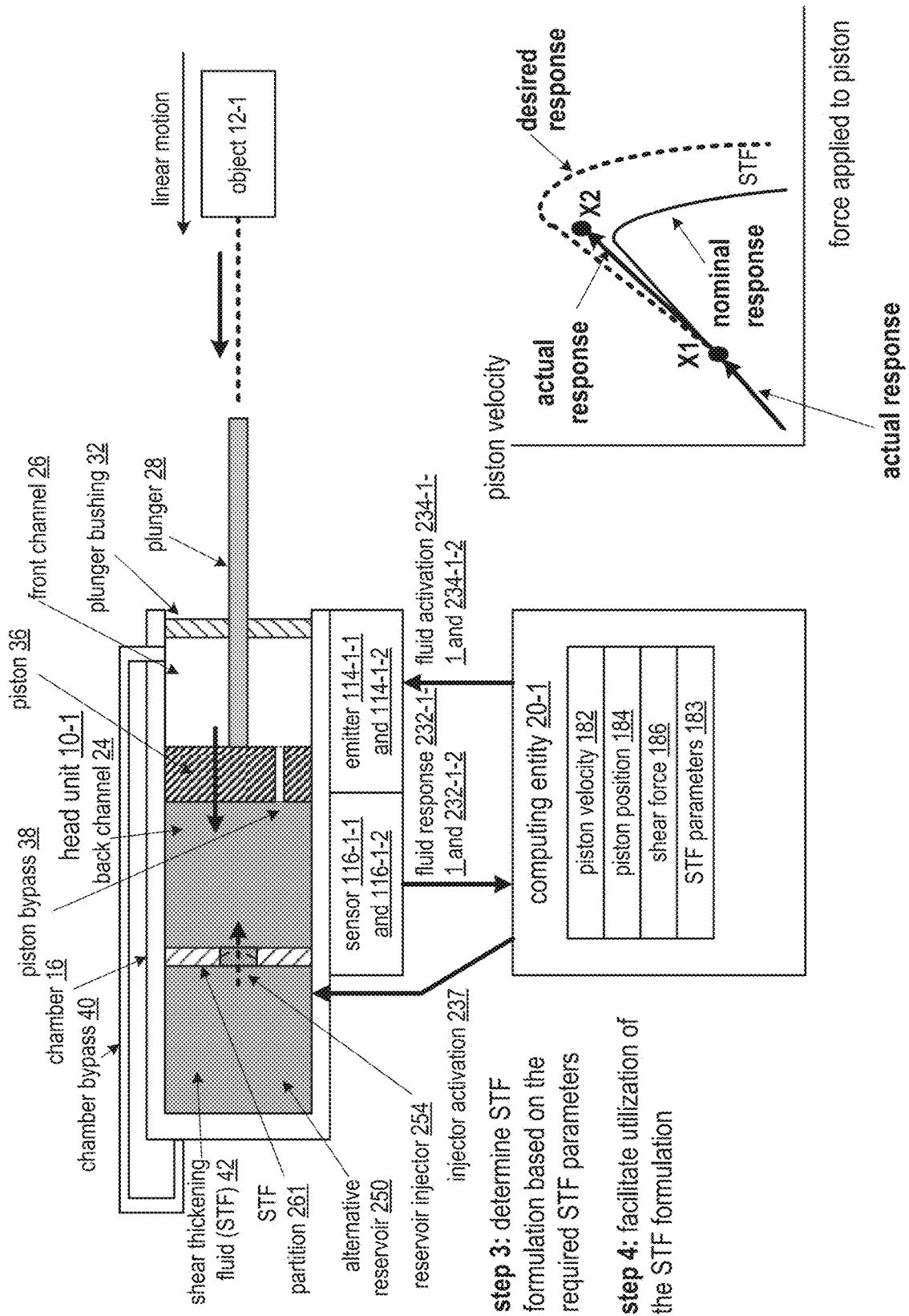

FIGS. 7A-7B are schematic block diagrams of another embodiment of a mechanical and computing system illustrating an example of controlling operational aspects. The mechanical and computing system includes the head unit 10-1 of FIG. 1, the object 12-1 of FIG. 1, and the computing entity 20-1 of FIG. 1.

In particular, the head unit 10-1 for controlling motion of the object 12-1 includes a chamber 16 to be filled at least in part with a shear thickening fluid (STF) 42. The head unit 10-1 further includes a piston 36 housed at least partially radially within the chamber 16. The piston 36 is configured to exert pressure against the shear thickening fluid 42 in response to movement of the piston 36 from a force applied to the piston 36 from the object 12-1.

The movement of the piston 36 includes one of traveling through the chamber 16 in an inward direction and traveling through the chamber 16 in an outward direction. The STF is configured to have a decreasing viscosity in response to a first range of shear rates and an increasing viscosity in response to a second range of shear rates. The head unit 10-1 further includes a set of fluid flow sensors 116-1-1 and 116-1-2 positioned proximal to the chamber 16. The set of fluid flow sensors provide a fluid response from the STF.

The head unit 10-1 further includes a set of fluid manipulation emitters 114-1-1 and 114-1-2 proximal to the chamber 16. The set of fluid manipulation emitters provide a fluid activation to the STF 42.

The chamber 16 further includes a STF partition 261 within the chamber between the piston and a closed-end of the chamber to dynamically affect volume of the chamber based on activation of the STF partition. The chamber includes a piston compartment and an alternative reservoir 250. The piston compartment includes a back channel 24 on an inward side of the piston 36 and a front channel 26 on the outward side of the piston 36. The alternative reservoir 250 is filled at least in part with a set of ingredients of the STF 42. The ingredients include fluid and nanoparticles as previously discussed.

The STF partition includes a reservoir injector 254. The reservoir injector 254 couples the alternative reservoir 250 to the piston compartment controlling the inflow of the one or more ingredients of the STF 42 from the alternative reservoir 250 to the piston compartment.

FIG. 7A illustrates an example of operation of a method for the controlling the operational aspects. A first step of the example of operation includes the computing entity 20-1 interpreting fluid response 232-1-1 from fluid flow sensor 116-1-1 and fluid response 232-1-2 from fluid flow sensor 116-1-2 to produce piston velocity 182 and piston position 184. The interpreting the fluid response further includes the computing entity 20-1 determining a shear force 186 based on the piston velocity 182 and piston position 184 as previously discussed. In an instance, the shear force 186 reveals the piston velocity versus force applied to the piston curve as illustrated in FIG. 7A, where at a current time of interpreting the response, the force and piston velocity are at a point X1.

Having determined the piston velocity and piston position, a second step of the example method of operation includes the computing entity 20-1 determining required STF parameters 183 based on the piston velocity in the piston position of the piston. The STF parameters includes the first range of shear rates and the second range of shear rates. The determining the STF parameters 183 includes a variety of approaches. A first approach includes performing a lookup based on the current velocity and position. A second approach includes selecting one of the first range of shear rates and the second range of shear rates based on a desired position for the piston is a function of the current velocity and position. For example, the computing entity 20-1 selects the second range of shear rates when the piston is to be abruptly slowed down. As another example, the computing entity 20-1 selects the first range of shear rates when the piston may continue traveling as is.

FIG. 7B further illustrates the example of operation for the method for the controlling of the operational aspects where, having determined the required STF parameters, in a third step the computing entity 20-1 determines a STF formulation based on the required STF parameters. The STF formulation includes a formulation of the STF ingredients to produce the STF in accordance with the required STF parameters. The determining of the STF formulation includes a variety of approaches. A first approach includes performing a lookup. A second approach includes utilizing a formula that uses inputs including current velocity and position and a desired velocity and position within a given timeframe to produce the STF formulation. A third approach includes utilizing the STF 42 when the STF 42 is premixed within the alternative reservoir 250.

Having produced the STF formulation, a fourth step of the example method of operation includes the computing entity 20-1 facilitating utilization of the STF formulation. For example, the computing entity 20-1 activates the reservoir injector 254 with and injector activation 237 based on the STF formulation to facilitate filling the back channel 24 of the chamber with the STF 42 to provide an actual response of force versus velocity as illustrated in the graph of FIG. 7B at a time X2. Alternatively, or in addition to, the computing entity 20-1 issues fluid activation 234-1-1 and 234-1-2 to the fluid manipulation emitters 114-1-1 and 114-1-2 to affect the utilization of the first or second ranges of shear rates of the STF to adjust the speed and position of the object 12-1.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

FIGS. 8A-8B are schematic block diagrams of another embodiment of a mechanical and computing system illustrating an example of controlling operational aspects. The mechanical and computing system provides a head unit system that includes the head unit 10-1 of FIG. 1, the object 12-1 of FIG. 1 (e.g., a door), a secondary object 12-2 (e.g., a person), a secondary object sensor (e.g., the environment sensor module 14 of FIG. 2B to detect the person), and the computing entity 20-1 of FIG. 1. The secondary object sensor is associated with the object 12-1 (e.g., the person is within a few feet of the door).

In particular, the head unit 10-1 for controlling motion of the object 12-1 includes shear thickening fluid (STF) 42. The STF is configured to have a decreasing viscosity in response to a first range of shear rates and an increasing viscosity in response to a second range of shear rates. The second range of shear rates are greater than the first range of shear rates.

The head unit 10-1 further include a chamber 16. The chamber 16 is configured to contain a portion of the STF. The chamber includes a front channel 26 and a back channel 24.

A piston 36 is housed at least partially radially within the chamber and separates the back channel 24 and the front 26. The piston 36 is configured to exert pressure against the shear thickening fluid 42 in response to movement of the piston 36 from a force applied to the piston 36 from the object 12-1. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF between the opposite sides of the piston from the back channel to the front channel when the piston is traveling through the chamber in the inward direction to cause the STF to react with a first shear threshold effect. The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber. The set of fluid flow sensors provide a fluid response 232-1-1 and 232-1-2 respectively from the STF.

The head unit 10-1 further includes a set of fluid manipulation emitters 114-1-1 and 114-1-2 positioned proximal to the chamber. The set of fluid manipulation emitters provide a fluid activation to at least one of the STF, the first piston bypass, and the second piston bypass to control the motion of the object 12-1 with regards to the secondary object 12-2.

FIG. 8A illustrates an example of operation of a method for the controlling the operational aspects. A first step of the example of operation includes the piston 36 moving inward towards the head unit 10-1 in response to a force from the object 12-1 through the plunger 28 to cause compression of the STF 42 in the back channel 24.

A second step of the example method of operation includes the computing entity 20-1 interpreting a fluid flow response from the set of fluid flow sensors to produce a piston velocity 182, a piston position 184, and a shear force 186 as previously discussed and as illustrated at time Y1 in the graph of FIG. 8A. The interpreting the fluid response from the set of fluid flow sensors to produce the piston velocity and the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid response.

A third sub-step includes determining the piston velocity based on the fluid response of the set of fluid flow sensors over the time range. For example, the computing entity 20-1 calculates piston velocity based on changes in the fluid response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity 182 and piston position 184. As a still further example of the interpreting the fluid response 232-1-1 and 232-1-2, the computing entity 20-1 extracts the piston velocity 182 and the piston position 184 directly from the fluid response 232-1-1 and/or 232-1-2 when the sensors 116-1-1 and 116-1-2 generate the piston velocity and piston position directly.

Having produced the piston velocity, the piston position, and the shear force, a third step of the example method of operation includes the computing entity 20-1 interpreting an output of the secondary object sensor to produce a position of the secondary object. The interpreting the output of the secondary object sensor to produce the position of the secondary object includes one or more sub-steps. A first sub-step includes interpreting environmental sensor information 150 to confirm that the secondary object 12-2 is proximal to the object 12-1. For example, the computing entity 20-1 interprets environment sensor information 150 from the environment sensor module 14 to detect the object 12-2 (e.g., the person) within a common area associated with the object 12-1 (e.g., the door).

In an embodiment, the first sub-step further includes determining and identity of the secondary object 12-2. For example, the computing entity 20-1 further interprets the environment sensor information 150 to identify the secondary object 12-2 as Bob rather than Sally.

A second sub-step includes determining a velocity vector for the secondary object based on environmental sensor information over an observation timeframe. For example, the computing entity 20-1 keeps track of position of the secondary object over a plurality of points in time to produce the velocity vector.

A third sub-step includes interpreting the velocity vector for the secondary object to produce the position of the secondary object. For example, the computing entity 20-1 integrates the velocity vector to produce the position of the secondary object.

Having detected the secondary object and produced the position of the secondary object, a fourth step of the example method of operation includes the computing entity determining a fluid activation for the head unit device based on one or more of identity of the secondary object (e.g., Bob versus Sally), the position of the secondary object, and one or more of the piston velocity, the piston position, and the shear force. The determining the fluid activation includes one or more of a variety of approaches. A first approach includes determining an object position for the object based on the piston velocity and the piston position. For example, the computing entity 20-1 maps piston position to object position based on a historical relationship (e.g., the object 12-1 and the piston 36 are operably coupled by the plunger 28).

A second approach includes interpreting a request associated with modifying one or more of object velocity and object position. For example, the computing entity 20-1 receives a request from another computing entity to speed up or slow down the door.

A third approach includes interpreting guidance from a chamber database. For example, the computing entity 20-1 interprets a desired fluid activation based on the identification of the secondary object 12-2. For instance, the door is to open with a higher velocity for Bob versus Sally.

A fourth approach establishing the fluid activation to include facilitating the first range of shear rates to speed up the object when detecting that a distance between the object and the secondary object is less than a minimum distance threshold based on the object position and the position of the secondary object and when the secondary object is moving closer to the object. For example, the computing entity 20-1 facilitates speeding up the door opening when the person is too close to the door.

A fifth approach includes establishing the fluid activation to include facilitating the first range of shear rates to speed up the object when detecting that the distance between the object and the secondary object is greater than a maximum distance threshold based on the object position and the position of the secondary object and when the secondary object is moving away from the object. For example, the computing entity 20-1 facilitates speeding up the door opening when the person is too far from the door.

A sixth approach includes establishing the fluid activation to include facilitating the second range of shear rates to slow down the object when detecting that the distance between the object and the secondary object is greater than the maximum distance threshold based on the object position and the position of the secondary object and when the secondary object is moving closer to the object. For example, the computing entity 20-1 facilitates slowing down the door when the door is closing too fast on the person.

A seventh approach includes establishing the fluid activation to include facilitating the second range of shear rates to slow down the object when detecting that the distance between the object and the secondary object is less than the minimum distance threshold based on the object position and the position of the secondary object and when the secondary object is moving away from the object. For example, the computing entity 20-1 facilitates slowing down the door when the door is opening too fast for the person.

A ninth approach includes establishing the fluid activation to include facilitating the second range of shear rates to slow down the object when detecting that a velocity difference between the piston velocity and a velocity of the secondary object is greater than a maximum velocity difference threshold, the piston velocity is greater than the velocity of the secondary object, and the secondary object is moving towards the object. For example, the computing entity facilitates slowing down the door when the door is opening too fast ahead of the person.

A tenth approach includes establishing the fluid activation to include facilitating the second range of shear rates to slow down the object when detecting that the velocity difference between the piston velocity and the velocity of the secondary object is less than a minimum velocity difference threshold, the piston velocity is greater than the velocity of the secondary object, and the secondary object is moving away from the object. For example, the computing entity 20-1 facilitates slowing down the door when the door is moving too fast ahead of the person.

An eleventh approach includes establishing the fluid activation to include facilitating the first range of shear rates to speed up the object when detecting that the velocity difference between the piston velocity and the velocity of the secondary object is greater than the maximum velocity difference threshold, the piston velocity is less than the velocity of the secondary object, and the secondary object is moving towards the object. For example, the computing entity 20-1 facilitates speeding up the door when the door is too slow for the person.

A twelfth approach includes establishing the fluid activation to include facilitating the first range of shear rates to speed up the object when detecting that the velocity difference between the piston velocity and the velocity of the secondary object is less than the minimum velocity difference threshold, the piston velocity is less than the velocity of the secondary object, and the secondary object is moving away from the object. For example, the computing entity 20-1 facilitates speeding up the door when the door is too slow for the person.

A thirteenth approach includes detecting an environmental condition warranting a change in viscosity of the STF. For example, the computing entity 20-1 identifies the possibility of a collision between the person in the door based on the positions and velocities of the door and the person if a nominal response of the STF were allowed to proceed past the point Y1 as illustrated in FIG. 8A.

The determining the fluid activation further includes selecting a type of activation to utilize the fluid activation as previously discussed. For example, the computing entity 20-1 selects further restricting an opening of the first piston bypass 38-1 to create more pressure in the back channel 24 to provide an actual response of force versus piston velocity as illustrated in the graph of FIG. 8A at a time Y2 when the door is to soft close slowly for the person as desired to avoid any collision.

Having determined the fluid activation, a fifth step of the example method of operation includes the computing entity 20-1 activating the set of fluid manipulation emitters 114-1-1 and 114-1-2 with the fluid activation 234-1-1 and 234-1-2 to manipulate the first shear threshold effect associated with the first piston bypass (e.g., to increase sheer force to move to the second range of shear rates such that the viscosity of the STF increases to slow down the door). Alternatively, as illustrated in FIG. 8B, the fluid manipulation emitters are activated to manipulate the second shear threshold effect associated with the second piston bypass to control the motion of the object with regards to the secondary object when the piston is moving in the outward direction. Alternatively, or in addition to, the head unit system further monitors the environment sensor module 14 to ensure that a collision does not happen between the object 12-2 and the object 12-1 (e.g., when a cart is being pushed through a door opening to prevent the door from hitting the cart).

The activating the set of fluid manipulation emitters in accordance with the fluid activation to manipulate one of the first shear threshold effect associated with the first piston bypass and the second shear threshold effect associated with the second piston bypass to control the motion of the object with regards to the secondary object includes two primary approaches.

When the piston is traveling through the chamber in the inward direction as illustrated in FIG. 8A, a first primary approach includes the computing entity 20-1 issuing the fluid activation to the set of fluid manipulation emitters to cause the first piston bypass 38-1 to facilitate the first shear threshold effect to include the first range of shear rates when the STF is to have the decreasing viscosity (e.g., speed up door opening or closing). Alternatively, the computing entity 20-1 issues the fluid activation to the set of fluid manipulation emitters to cause the first piston bypass 38-1 to facilitate the first shear threshold effect to include the second range of shear rates when the STF is to have the increasing viscosity (e.g., to slow down the door opening or closing).

When the piston is traveling through the chamber in the outward direction as illustrated in FIG. 8B, a second primary approach includes the computing entity 20-1 issuing the fluid activation to the set of fluid manipulation emitters to cause the second piston bypass 38-2 to facilitate the second shear threshold effect to include the first range of shear rates when the STF is to have the decreasing viscosity (e.g., speed up the door opening or closing). Alternatively, the computing entity 20-1 issues the fluid activation to the set of fluid manipulation emitters to cause the second piston bypass to facilitate the second shear threshold effect to include the second range of shear rates when the STF is to have the increasing viscosity (e.g., to slow down the door opening or closing).

FIG. 8B further illustrates the example of operation of the method for the controlling the operational aspects. A sixth step of the example method of operation includes the piston 36 moving outward away from the head unit 10-1 in response to a pulling force from the object 12-1 through the plunger 28 to cause compression of the STF 42 in the front channel 26 (e.g., opening of the door).

A seventh step of the example method of operation includes the computing entity 20-1 further interpreting a fluid flow response from the set of fluid flow sensors to produce the piston velocity 182, the piston position 184, and the shear force 186 as previously discussed and as illustrated at time Y3 in the graph of FIG. 8B.

Having produced the piston velocity, the piston position, and the shear force, an eighth step of the example method of operation includes the computing entity 20-1 determining the fluid activation for the head unit device based an updated position for the object 12-2, and based on one or more of the piston velocity, the piston position, and the shear force as previously discussed. The determining the fluid activation includes determining a desired response. For example, the computing entity 20-1 determines to significantly decrease the viscosity of the STF to affect a faster opening of the door when the object 12-1 includes the door that is about to open too slowly and collide with the object 12-2

The determining the fluid activation further includes selecting the type of activation to utilize the fluid activation. For example, the computing entity 20-1 selects further widening the opening of the second piston bypass 38-2 to create less pressure in the front channel 26 to provide an actual response of force versus piston velocity as illustrated in the graph of FIG. 8B at a time Y4 when the door should quickly open in avoid a collision with the object 12-2 (e.g., the person).

Having determined the fluid activation, a ninth step of the example method of operation includes the computing entity 20-1 activating the set of fluid manipulation emitters 114-1-1 and 114-1-2 with the fluid activation 234-1-1 and 234-1-2 to manipulate the second shear threshold effect associated with the second piston bypass 38-2 (e.g., to decrease shear force to move to the first range of shear rates such that the viscosity of the STF decreases to speed up the door as it opens ahead of the person).

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

FIGS. 9A-9B are schematic block diagrams of another embodiment of a mechanical and computing system illustrating an example of controlling operational aspects. The mechanical and computing system provides a head unit system that includes the head units 10-1 and 10-2 of FIG. 1, the object 12-1 (e.g., a first door), object 12-2 (e.g., a person), and object 12-3 (e.g., a second door) of FIG. 1, secondary object sensors (e.g., the environment sensor module 14 of FIG. 2B to detect the person), and the computing entities 20-1 in 20-2 of FIG. 1. The secondary object sensors are associated with their respective head units to detect a common object 12-2 moving between areas associated with the object 12-1 in the object 12-2 (e.g., the person walking through the first door and then the second door).

In particular, each head unit (e.g., 10-1 and 10-2) for controlling motion of the objects (e.g., 12-1 and 12-3) includes a chamber 16 filled at least in part with a shear thickening fluid (STF) 42. The chamber includes a back channel 24 on an inward side of the piston 36 and a front channel 26 on the outward side of the piston 36. The head unit further includes a piston 36 housed at least partially radially within the chamber 16. The piston 36 is configured to exert pressure against the shear thickening fluid 42 in response to movement of the piston 36 from a force applied to the piston 36 from the respective object.

The movement of the piston 36 includes one of traveling through the chamber 16 in an inward direction and traveling through the chamber 16 in an outward direction. The STF is configured to have a decreasing viscosity in response to a first range of shear rates and an increasing viscosity in response to a second range of shear rates.

The piston 36 includes at least one piston bypass (e.g., a first piston bypass 38-1 between opposite sides of the piston that controls flow of the STF between the opposite sides of the piston from the back channel 24 to the front channel 26 when the piston is traveling through the chamber in the inward direction to cause the STF to react with a first shear threshold effect). When including another piston bypass, the piston 36 further includes a second piston bypass 38-2 between the opposite sides of the piston that controls flow of the STF between the opposite sides of the piston from the front channel 26 to the back channel 24 when the piston is traveling through the chamber in the outward direction to cause the STF to react with a second shear threshold effect.

The head unit further includes a set of fluid flow sensors 116-1-1 and 116-1-2 positioned proximal to the chamber 16 of the head unit 10-1. The set of fluid flow sensors provide a fluid response from the STF 42. The head unit 10-1 further includes a set of fluid manipulation emitters 114-1-1 and 114-1-2 proximal to the chamber 16. The set of fluid manipulation emitters provide a fluid activation to at least one of the STF 42, the first piston bypass 38-1, and the second piston bypass 38-2 to control motion of the object 12-1 with regards to the secondary object 12-2.

FIG. 9A illustrates an example of operation of a method for the controlling the operational aspects. A first step of the example of operation includes the piston 36 moving inward towards the first head unit 10-1 in response to a force from the object 12-1 through the plunger 28 to cause compression of the STF 42 in the back channel 24.

A second step of the example method of operation includes the computing entity 20-1 interpreting a fluid flow response from the set of fluid flow sensors to produce a piston velocity 182, a piston position 184, and a shear force 186 as previously discussed. Having produced the piston velocity, the piston position, and the shear force, a third step of the example method of operation includes the computing entity 20-1 interpreting an output of the secondary object sensor to produce a position of the secondary object. For example, the computing entity 20-1 interprets environment sensor information 150-1 from the environment sensor module 14-1 to detect the object 12-2 (e.g., the person) within a common area associated with the object 12-1 (e.g., the first door) as the position of the secondary object.

Having detected the secondary object, a fourth step of the example method of operation includes the computing entity 20-1 determining a fluid activation for the head unit device based on identity of the secondary object, the position of the secondary object, and one or more of the piston velocity, the piston position, and the shear force when fluid activation from the head unit 10-2 is unavailable. The determining the fluid activation includes determining a desired response as previously discussed for a variety of approaches. For example, the computing entity 20-1 determines to significantly increase the viscosity of the STF to affect a slow close of the door when the object 12-1 includes the door that is about to close too fast based on identity of the object 12-2.

The determining the fluid activation further includes the computing entity 20-1 activating the set of fluid manipulation emitters 114-1-1 and 114-1-2 with the fluid activation 234-1-1 and 234-1-2 to manipulate the first shear threshold effect associated with the first piston bypass (e.g., to increase shear force to move to the second range of shear rates such that the viscosity of the STF increases to slow down the door). Alternatively, or in addition to, the head unit system further monitors the environment sensor module 14 to ensure that a collision does not happen between the object 12-2 and the object 12-1 (e.g., when a cart is being pushed through a door opening to prevent the door from hitting the cart).

Having determined and utilize the fluid activation, a fifth step of the example method of operation includes the computing entity 20-1 issuing a system message 162 to the computing entity 20-2 to affect optimize operation of the head unit 10-2 for the object 12-2 (e.g., as the person walks from the first door to the second door). The issuing of the system message 162 includes generating the system message 162 to include the fluid activation and one or more of the piston velocity, the piston position, and the sheer force as determined by the computing entity 20-1 for the head unit 10-1. The issuing of the system message 162 further includes sending the system message 162 to the computing entity 20-2.

FIG. 9B further illustrates the example of operation of the method for the controlling the operational aspects. A sixth step of the example method of operation includes obtaining another fluid activation for another head unit device based on a previous position of the secondary object and one or more of a piston velocity and a piston position of the other head unit device. For instance, the computing entity 20-2 interprets the system message 162 to extract the fluid activation utilized by the head unit 10-1 and identity of the object 12-2.

Having obtained the other fluid activation, the example method of operation includes the computing entity 20-2 detecting the secondary object. For example, the computing entity 20-1 interprets environment sensor information 150-2 from the environment sensor module 14-2 to identify the object 12-2 has moved to a common area associated with the object 12-3.

An eight step of the example method of operation includes the piston 36 of the head unit 10-2 moving inward away towards the head unit 10-2 in response to a force from the object 12-3 through the plunger 28 to cause compression of the STF 42 in the front channel 26 (e.g., opening of the door).

A ninth step of the example method of operation includes the computing entity 20-2 further interpreting a fluid flow response from the set of fluid flow sensors of the head unit 10-2 to produce the piston velocity 182, the piston position 184, and the shear force 186 as previously discussed. For instance, the computing entity 20-2 receives a fluid response 232-2-1 from sensor 116-2-1.

Having produced the piston velocity, the piston position, and the shear force, a tenth step of the example method of operation includes the computing entity 20-2 determining a fluid activation for the head unit device 10-2 based the position for the object 12-2, and based on one or more of the piston velocity, the piston position, and the shear force of the head unit 10-2. The determining the fluid activation includes determining a desired response. For example, the computing entity 20-2 determines to significantly decrease the viscosity of the STF to affect a faster opening of the door when the object 12-3 includes the second door that is about to open too slowly and collide with the object 12-2.

The determining the fluid activation further includes selecting the type of activation to utilize the fluid activation. For example, the computing entity 20-1 selects further widening the opening of the first piston bypass 38-1 of the head unit 10-2 to create less pressure in the back channel 24 to provide an actual response opening the second door more quickly to avoid a collision with the object 12-2 (e.g., the person).

The tenth step further includes the computing entity 20-2 activating the set of fluid manipulation emitters 114-2-1 and 114-2-2 with the fluid activation 234-2-1 and 234-2-2 to manipulate the first shear threshold effect associated with the first piston bypass 38-1 (e.g., to decrease shear force to move to the first range of shear rates such that the viscosity of the STF decreases to speed up the door as it opens ahead of the person).

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A head unit system for controlling motion of an object, comprising:
  a secondary object sensor, wherein a secondary object is associated with the object; and
  a head unit device, wherein the head unit device includes:
    shear thickening fluid (STF), wherein the STF is configured to have a decreasing viscosity in response to a first range of shear rates and an increasing viscosity in response to a second range of shear rates, wherein the second range of shear rates are greater than the first range of shear rates;
    a chamber, the chamber configured to contain a portion of the STF, wherein the chamber includes a front channel and a back channel;
    a piston housed at least partially radially within the chamber and separating the back channel and the front channel, the piston configured to exert pressure against the shear thickening fluid in response to movement of the piston from a force applied to the piston from the object, wherein the movement of the piston includes one of traveling through the chamber in an inward direction or traveling through the chamber in an outward direction,
    wherein the piston travels toward the back channel and away from the front channel when traveling in the inward direction, wherein the piston travels toward the front channel and away from the back channel when traveling in the outward direction, wherein the piston includes:
      a first piston bypass between opposite sides of the piston that controls flow of the STF in only one direction between the opposite sides of the piston from the back channel to the front channel when the piston is traveling through the chamber in the inward direction to cause the STF to react with a first shear threshold effect, and
      a second piston bypass between the opposite sides of the piston that controls flow of the STF in only one direction between the opposite sides of the piston from the front channel to the back channel when the piston is traveling through the chamber in the outward direction to cause the STF to react with a second shear threshold effect; and
    a set of fluid manipulation emitters positioned proximal to the chamber, wherein the set of fluid manipulation emitters provide a fluid activation to at least one of the STF, the first piston bypass, and the second piston bypass to control the motion of the object with regards to the secondary object.

2. The head unit system of claim 1, wherein the head unit device further comprises:
  a plunger between the object and the piston, the plunger configured to apply the force from the object to move the piston within the chamber; and
  a plunger bushing to guide the plunger into the chamber in response to the force from the object, wherein the plunger bushing facilitates containment of the STF within the chamber, wherein the plunger bushing remains in a fixed position relative to the chamber when the force from the object moves the piston within the chamber.

3. The head unit system of claim 1, wherein the STF comprises:
  a plurality of nanoparticles, wherein the plurality of nanoparticles includes one or more of an oxide, calcium carbonate, synthetically occurring minerals, naturally occurring minerals, polymers, SiO2, polystyrene, polymethylmethacrylate, or a mixture thereof; and
  one or more of ethylene glycol, polyethylene glycol, ethanol, silicon oils, phenyltrimethicone, or a mixture thereof.

4. The head unit system of claim 1, wherein the head unit device further comprises:
  a chamber bypass between opposite ends of the chamber, wherein the chamber bypass facilitates flow of a portion of the STF between the opposite ends of the chamber when the piston travels through the chamber in the inward or the outward direction.

5. The head unit device of claim 1, wherein the head unit device further comprises:
  when the piston is traveling through the chamber in the inward direction the first shear threshold effect includes:
    the first range of shear rates when the STF is configured to have the decreasing viscosity, and
    the second range of shear rates when the STF is configured to have the increasing viscosity; and
  when the piston is traveling through the chamber in the outward direction the second shear threshold effect includes:
    the first range of shear rates when the STF is configured to have the decreasing viscosity, and
    the second range of shear rates when the STF is configured to have the increasing viscosity.

6. The head unit system of claim 1, wherein the first piston bypass comprises:
  one or more of a one-way check valve and a variable flow valve;
  when the piston is traveling through the chamber in the inward direction as the only one direction:
    a first setting of the variable flow valve facilitates the first range of shear rates when the STF is to have the decreasing viscosity, and
    a second setting of the variable flow valve facilitates the second range of shear rates when the STF is to have the increasing viscosity; and
  when the piston is traveling through the chamber in the outward direction:
    the one-way check valve prevents STF flow through the first piston bypass.

7. The head unit system of claim 1, wherein the second piston bypass comprises:
  one or more of a one-way check valve and a variable flow valve;
  when the piston is traveling through the chamber in the inward direction as the only one direction:
    the one-way check valve prevents STF flow through the second piston bypass; and
  when the piston is traveling through the chamber in the outward direction:
    a first setting of the variable flow valve facilitates the first range of shear rates when the STF is to have the decreasing viscosity, and a second setting of the variable flow valve facilitates the second range of shear rates when the STF is to have the increasing viscosity.

8. The head unit device of claim 1, wherein the set of fluid manipulation emitters comprises one or more of:
a variable flow valve associated with one or more of the first piston bypass and the second piston bypass,
a mechanical vibration generator,
an image generator,
a light emitter,
an audio transducer,
a speaker,
an ultrasonic sound transducer,
an electric field generator,
a magnetic field generator, and
a radio frequency wireless field transmitter.

9. A method for execution by a computing device, the method comprises:
determining a piston velocity and a piston position of a piston associated with a head unit device of a head unit system, wherein the head unit device controls motion of an object with regards to a secondary object, wherein the head unit system includes:
a secondary object sensor, wherein the secondary object is associated with the object, and
the head unit device, wherein the head unit device includes:
shear thickening fluid (STF), wherein the STF is configured to have a decreasing viscosity in response to a first range of shear rates and an increasing viscosity in response to a second range of shear rates, wherein the second range of shear rates are greater than the first range of shear rates,
a chamber, the chamber configured to contain a portion of the STF, wherein the chamber includes a front channel and a back channel,
a piston housed at least partially radially within the chamber and separating the back channel and the front channel, the piston configured to exert pressure against the shear thickening fluid in response to movement of the piston from a force applied to the piston from the object, wherein the movement of the piston includes one of traveling through the chamber in an inward direction or traveling through the chamber in an outward direction, wherein the piston travels toward the back channel and away from the front channel when traveling in the inward direction,
wherein the piston travels toward the front channel and away from the back channel when traveling in the outward direction, wherein the piston includes:
a first piston bypass between opposite sides of the piston that controls flow of the STF in only one direction between the opposite sides of the piston from the back channel to the front channel when the piston is traveling through the chamber in the inward direction to cause the STF to react with a first shear threshold effect, and
a second piston bypass between the opposite sides of the piston that controls flow of the STF in only one direction between the opposite sides of the piston from the front channel to the back channel when the piston is traveling through the chamber in the outward direction to cause the STF to react with a second shear threshold effect, and a set of fluid manipulation emitters positioned proximal to the chamber, wherein the set of fluid manipulation emitters provide a fluid activation to at least one of the STF, the first piston bypass, and the second piston bypass to control the motion of the object with regards to the secondary object;
interpreting an output of the secondary object sensor to produce a position of the secondary object,
wherein the interpreting the output of the secondary object sensor includes one or more of:
interpreting environmental sensor information to confirm that the secondary object is proximal to the object;
determining a velocity vector for the secondary object based on environmental sensor information over an observation timeframe; and
interpreting the velocity vector for the secondary object to produce the position of the secondary object;
determining the fluid activation for the head unit device based on the position of the secondary object and one or more of the piston velocity and the piston position; and
activating the set of fluid manipulation emitters in accordance with the fluid activation to manipulate one of the first shear threshold effect associated with the first piston bypass and the second shear threshold effect associated with the second piston bypass to control the motion of the object with regards to the secondary object.

10. The method of claim 9, wherein the determining the fluid activation for the head unit device based on the position of the secondary object and one or more of the piston velocity and the piston position comprises one or more of:
determining an object position for the object based on the piston velocity and the piston position;
interpreting a request associated with modifying one or more of object velocity and object position;
interpreting guidance from a chamber database;
establishing the fluid activation to include facilitating the first range of shear rates to speed up the object when detecting that a distance between the object and the secondary object is less than a minimum distance threshold based on the object position and the position of the secondary object and when the secondary object is moving closer to the object;
establishing the fluid activation to include facilitating the first range of shear rates to speed up the object when detecting that the distance between the object and the secondary object is greater than a maximum distance threshold based on the object position and the position of the secondary object and when the secondary object is moving away from the object;
establishing the fluid activation to include facilitating the second range of shear rates to slow down the object when detecting that the distance between the object and the secondary object is greater than the maximum distance threshold based on the object position and the position of the secondary object and when the secondary object is moving closer to the object;
establishing the fluid activation to include facilitating the second range of shear rates to slow down the object when detecting that the distance between the object and the secondary object is less than the minimum distance threshold based on the object position and the position of the secondary object and when the secondary object is moving away from the object;

establishing the fluid activation to include facilitating the second range of shear rates to slow down the object when detecting that a velocity difference between the piston velocity and a velocity of the secondary object is greater than a maximum velocity difference threshold, the piston velocity is greater than the velocity of the secondary object, and the secondary object is moving towards the object;

establishing the fluid activation to include facilitating the second range of shear rates to slow down the object when detecting that the velocity difference between the piston velocity and the velocity of the secondary object is less than a minimum velocity difference threshold, the piston velocity is greater than the velocity of the secondary object, and the secondary object is moving away from the object;

establishing the fluid activation to include facilitating the first range of shear rates to speed up the object when detecting that the velocity difference between the piston velocity and the velocity of the secondary object is greater than the maximum velocity difference threshold, the piston velocity is less than the velocity of the secondary object, and the secondary object is moving towards the object;

establishing the fluid activation to include facilitating the first range of shear rates to speed up the object when detecting that the velocity difference between the piston velocity and the velocity of the secondary object is less than the minimum velocity difference threshold, the piston velocity is less than the velocity of the secondary object, and the secondary object is moving away from the object; and detecting an environmental condition warranting a change in viscosity of the STF.

11. The method of claim 9, wherein the activating the set of fluid manipulation emitters in accordance with the fluid activation to manipulate one of the first shear threshold effect associated with the first piston bypass and the second shear threshold effect associated with the second piston bypass to control the motion of the object with regards to the secondary object comprises:

when the piston is traveling through the chamber in the inward direction as the only one direction:
issuing the fluid activation to the set of fluid manipulation emitters to cause the first piston bypass to facilitate the first shear threshold effect to include the first range of shear rates when the STF is to have the decreasing viscosity, and
issuing the fluid activation to the set of fluid manipulation emitters to cause the first piston bypass to facilitate the first shear threshold effect to include the second range of shear rates when the STF is to have the increasing viscosity; and when the piston is traveling through the chamber in the outward direction as the only one direction:
issuing the fluid activation to the set of fluid manipulation emitters to cause the second piston bypass to facilitate the second shear threshold effect to include the first range of shear rates when the STF is to have the decreasing viscosity, and
issuing the fluid activation to the set of fluid manipulation emitters to cause the second piston bypass to facilitate the second shear threshold effect to include the second range of shear rates when the STF is to have the increasing viscosity.

12. A non-transitory computer readable memory comprises:
a first memory element that stores operational instructions that, when executed by a processing module, causes the processing module to:
determine a piston velocity and a piston position of a piston associated with a head unit device of a head unit system, wherein the head unit device controls motion of an object with regards to a secondary object, wherein the head unit system includes:
a secondary object sensor, wherein the secondary object is associated with the object, and
the head unit device, wherein the head unit device includes:
shear thickening fluid (STF), wherein the STF is configured to have a decreasing viscosity in response to a first range of shear rates and an increasing viscosity in response to a second range of shear rates, wherein the second range of shear rates are greater than the first range of shear rates,
a chamber, the chamber configured to contain a portion of the STF, wherein the chamber includes a front channel and a back channel,
a piston housed at least partially radially within the chamber and separating the back channel and the front channel, the piston configured to exert pressure against the shear thickening fluid in response to movement of the piston from a force applied to the piston from the object, wherein the movement of the piston includes one of traveling through the chamber in an inward direction or traveling through the chamber in an outward direction,
wherein the piston travels toward the back channel and away from the front channel when traveling in the inward direction, wherein the piston travels toward the front channel and away from the back channel when traveling in the outward direction, wherein the piston includes:
a first piston bypass between opposite sides of the piston that controls flow of the STF in only one direction between the opposite sides of the piston from the back channel to the front channel when the piston is traveling through the chamber in the inward direction to cause the STF to react with a first shear threshold effect, and
a second piston bypass between the opposite sides of the piston that controls flow of the STF in only one direction between the opposite sides of the piston from the front channel to the back channel when the piston is traveling through the chamber in the outward direction to cause the STF to react with a second shear threshold effect, and
a set of fluid manipulation emitters positioned proximal to the chamber,
wherein the set of fluid manipulation emitters provide a fluid activation to at least one of the STF, the first piston bypass, and the second piston bypass to control the motion of the object with regards to the secondary object;
a second memory element that stores operational instructions that, when executed by the processing module, causes the processing module to:
interpret an output of the secondary object sensor to produce a position of the secondary object, wherein the processing module interprets the output of the secondary object sensor by one or more of:
    interpreting environmental sensor information to confirm that the secondary object is proximal to the object;
    determining a velocity vector for the secondary object based on environmental sensor information over an observation timeframe; and
    interpreting the velocity vector for the secondary object to produce the position of the secondary object;
a third memory element that stores operational instructions that, when executed by the processing module, causes the processing module to:
    determine the fluid activation for the head unit device based on the position of the secondary object and one or more of the piston velocity and the piston position; and
a fourth memory element that stores operational instructions that, when executed by the processing module, causes the processing module to:
    activate the set of fluid manipulation emitters in accordance with the fluid activation to manipulate one of the first shear threshold effect associated with the first piston bypass and the second shear threshold effect associated with the second piston bypass to control the motion of the object with regards to the secondary object.

13. The non-transitory computer readable memory of claim 12, wherein the processing module performs functions to execute the operational instructions stored by the third memory element to cause the processing module to determine the fluid activation for the head unit device based on the position of the secondary object and one or more of the piston velocity and the piston position by one or more of:
    determining an object position for the object based on the piston velocity and the piston position;
    interpreting a request associated with modifying one or more of object velocity and object position;
    interpreting guidance from a chamber database;
    establishing the fluid activation to include facilitating the first range of shear rates to speed up the object when detecting that a distance between the object and the secondary object is less than a minimum distance threshold based on the object position and the position of the secondary object and when the secondary object is moving closer to the object;
    establishing the fluid activation to include facilitating the first range of shear rates to speed up the object when detecting that the distance between the object and the secondary object is greater than a maximum distance threshold based on the object position and the position of the secondary object and when the secondary object is moving away from the object;
    establishing the fluid activation to include facilitating the second range of shear rates to slow down the object when detecting that the distance between the object and the secondary object is greater than the maximum distance threshold based on the object position and the position of the secondary object and when the secondary object is moving closer to the object;
    establishing the fluid activation to include facilitating the second range of shear rates to slow down the object when detecting that the distance between the object and the secondary object is less than the minimum distance threshold based on the object position and the position of the secondary object and when the secondary object is moving away from the object;
    establishing the fluid activation to include facilitating the second range of shear rates to slow down the object when detecting that a velocity difference between the piston velocity and a velocity of the secondary object is greater than a maximum velocity difference threshold, the piston velocity is greater than the velocity of the secondary object, and the secondary object is moving towards the object;
    establishing the fluid activation to include facilitating the second range of shear rates to slow down the object when detecting that the velocity difference between the piston velocity and the velocity of the secondary object is less than a minimum velocity difference threshold, the piston velocity is greater than the velocity of the secondary object, and the secondary object is moving away from the object;
    establishing the fluid activation to include facilitating the first range of shear rates to speed up the object when detecting that the velocity difference between the piston velocity and the velocity of the secondary object is greater than the maximum velocity difference threshold, the piston velocity is less than the velocity of the secondary object, and the secondary object is moving towards the object;
    establishing the fluid activation to include facilitating the first range of shear rates to speed up the object when detecting that the velocity difference between the piston velocity and the velocity of the secondary object is less than the minimum velocity difference threshold, the piston velocity is less than the velocity of the secondary object, and the secondary object is moving away from the object; and
    detecting an environmental condition warranting a change in viscosity of the STF.

14. The non-transitory computer readable memory of claim 12, wherein the processing module performs functions to execute the operational instructions stored by the fourth memory element to cause the processing module to activate the set of fluid manipulation emitters in accordance with the fluid activation to manipulate one of the first shear threshold effect associated with the first piston bypass and the second shear threshold effect associated with the second piston bypass to control the motion of the object with regards to the secondary object by:
    when the piston is traveling through the chamber in the inward direction as the only one direction:
        issuing the fluid activation to the set of fluid manipulation emitters to cause the first piston bypass to facilitate the first shear threshold effect to include the first range of shear rates when the STF is to have the decreasing viscosity, and
        issuing the fluid activation to the set of fluid manipulation emitters to cause the first piston bypass to facilitate the first shear threshold effect to include the second range of shear rates when the STF is to have the increasing viscosity; and
    when the piston is traveling through the chamber in the outward direction as the only one direction:
        issuing the fluid activation to the set of fluid manipulation emitters to cause the second piston bypass to facilitate the second shear threshold effect to include the first range of shear rates when the STF is to have the decreasing viscosity, and
        issuing the fluid activation to the set of fluid manipulation emitters to cause the second piston bypass to facilitate the second shear threshold effect to include the second range of shear rates when the STF is to have the increasing viscosity.

\* \* \* \* \*